US009022237B2

(12) United States Patent
Hall et al.

(10) Patent No.: US 9,022,237 B2
(45) Date of Patent: May 5, 2015

(54) EXTENDABLE STORAGE DEVICE

(71) Applicants: David Hall, Grand Junction, CO (US);
Jenny L. Hall, Grand Junction, CO (US)

(72) Inventors: David Hall, Grand Junction, CO (US);
Jenny L. Hall, Grand Junction, CO (US)

(73) Assignee: Glideware, LLC., Grand Junction, CO (US)

( * ) Notice: Subject to any disclaimer, the term of this patent is extended or adjusted under 35 U.S.C. 154(b) by 0 days.

(21) Appl. No.: 14/285,258

(22) Filed: May 22, 2014

(65) Prior Publication Data
US 2014/0346129 A1    Nov. 27, 2014

Related U.S. Application Data

(63) Continuation-in-part of application No. 29/491,483, filed on May 21, 2014.

(60) Provisional application No. 61/826,408, filed on May 22, 2013.

(51) Int. Cl.
*A47F 5/00* (2006.01)
*A47J 47/16* (2006.01)
*A47B 53/00* (2006.01)

(52) U.S. Cl.
CPC .............. *A47J 47/16* (2013.01); *Y10T 29/4984* (2015.01); *A47B 53/00* (2013.01); *A47F 2005/0012* (2013.01)

(58) Field of Classification Search
CPC ................. A47J 47/16; Y10T 29/4984; A47F 2005/0012; A47B 53/00
USPC .................. 211/94.01, 162, 124, 85.3, 105.3, 211/86.01, 85.29; 248/690, 244, 295.11, 248/307, 323, 339; 312/246, 334.23
See application file for complete search history.

(56) References Cited

U.S. PATENT DOCUMENTS

| 867,567 | A | * | 10/1907 | Bast | 211/85.3 |
|---|---|---|---|---|---|
| 869,233 | A | * | 10/1907 | Drucker | 211/85.3 |
| 894,231 | A | * | 7/1908 | Purcell | 211/85.3 |
| 897,112 | A | * | 8/1908 | Lawrence | 211/85.3 |
| 943,137 | A | * | 12/1909 | Buckingham | 211/85.3 |
| 1,093,232 | A | * | 4/1914 | Wolf | 211/85.3 |
| 1,127,782 | A | * | 2/1915 | Kurtzon | 211/85.3 |
| 1,255,584 | A | | 2/1918 | Clark | |
| 1,415,316 | A | | 5/1922 | Corbin | |
| 1,613,447 | A | | 1/1927 | Ellberg | |
| 1,814,692 | A | | 7/1931 | Harris | |

(Continued)

OTHER PUBLICATIONS

Image "Legalized-Pot-Rack-H-D-Pull-Out-Hanging-Pot_57.jpg" Date Unknown, 1 page [retrieved from: http://www.bing.com/images/search?q=pull+out+pan+storage&FORM=IQFRBA&id=5E4FB75D99BFE83A1FCC48BF3EA6629EC6CB0899&selectedIndex=0#view=detail&id=19C12E7F4491B34CE92E6ED7F7B2666DDAC3E2A9&selectedIndex=13].

(Continued)

*Primary Examiner* — Joshua J Michener
*Assistant Examiner* — Devin Barnett
(74) *Attorney, Agent, or Firm* — Sheridan Ross P.C.

(57) ABSTRACT

A storage device comprising an extendable center piece slidingly-attached to one or more supports, the center piece including a slot that runs vertically through the center piece for at least a portion of a length of the center piece and providing a surface to support at least one hook, wherein the hook is disposed in the slot formed in the center piece and the hook extends through the slot and below the bottom surface of the center-piece, each hook providing an interface for hanging and storing an item within a cabinet or other suitable storage space.

17 Claims, 24 Drawing Sheets

(56) References Cited

U.S. PATENT DOCUMENTS

| | | | |
|---|---|---|---|
| 2,580,961 A * | 1/1952 | Schmedinghoff | 211/119.003 |
| 2,606,666 A | 8/1952 | Gray | |
| 2,608,305 A | 8/1952 | Sager | |
| 2,611,492 A | 9/1952 | Watts | |
| 2,683,890 A * | 7/1954 | Rosenbaum | 16/87.4 R |
| 2,757,804 A | 8/1956 | Sadwin | |
| 2,758,904 A | 8/1956 | Hansell et al. | |
| 2,788,132 A | 4/1957 | Lewis | |
| 2,917,185 A * | 12/1959 | Kovacs | 211/94.01 |
| 2,985,311 A * | 5/1961 | Abel | 211/85.3 |
| 2,987,289 A | 6/1961 | Wamsley | |
| 3,124,253 A * | 3/1964 | Petrich | 211/94.01 |
| 3,132,832 A | 5/1964 | Kore, Jr. | 248/307 |
| 3,160,279 A * | 12/1964 | Hovey | 211/94.01 |
| 3,175,243 A | 3/1965 | Weber | |
| 3,198,594 A | 8/1965 | Murray | |
| 3,249,233 A * | 5/1966 | Marcus et al. | 211/105.3 |
| 3,335,872 A * | 8/1967 | Dodich | 211/85.3 |
| 3,379,484 A | 4/1968 | Kling | |
| 3,389,807 A | 6/1968 | Manning et al. | |
| 3,431,585 A * | 3/1969 | Foltz | 16/94 D |
| 3,469,710 A * | 9/1969 | Vosbikian | 211/116 |
| 3,602,372 A * | 8/1971 | Verrecchio | 211/100 |
| 3,606,948 A * | 9/1971 | Strang | 11/4 |
| 3,627,143 A | 12/1971 | Alexander | |
| 3,664,512 A * | 5/1972 | Smith | 211/113 |
| 3,780,875 A | 12/1973 | Scholl | |
| 3,897,122 A * | 7/1975 | McEvers | 312/321 |
| 3,954,182 A * | 5/1976 | McEvers | 211/94.01 |
| 3,998,332 A | 12/1976 | Lambertson | |
| 4,282,630 A * | 8/1981 | Toder | 16/93 D |
| 4,290,531 A | 9/1981 | Lazarus, III | |
| 4,364,592 A | 12/1982 | Jackson | |
| D273,645 S * | 5/1984 | McEvers | D6/513 |
| D277,436 S * | 2/1985 | Benedict | D6/315 |
| 4,585,127 A * | 4/1986 | Benedict | 211/34 |
| 4,632,255 A | 12/1986 | Kennedy | 211/1.3 |
| 4,673,089 A * | 6/1987 | Chap | 211/41.2 |
| 4,714,166 A | 12/1987 | Hann et al. | |
| 4,771,899 A * | 9/1988 | Benedict et al. | 211/60.1 |
| 4,869,379 A * | 9/1989 | Hawkrige | 211/100 |
| D334,291 S * | 3/1993 | Rooke | D6/317 |
| 5,238,127 A | 8/1993 | Geller | |
| 5,249,856 A | 10/1993 | Dreier | |
| 1,132,190 A | 3/1995 | Kohout | |
| 5,590,940 A * | 1/1997 | Richard | 312/287 |
| D392,130 S | 3/1998 | Wangler | |
| D392,133 S * | 3/1998 | Chen | D6/513 |
| 5,904,412 A | 5/1999 | Lammens | |
| 5,908,120 A * | 6/1999 | Yates et al. | 211/119 |
| 6,017,108 A | 1/2000 | Domenig | |
| 6,039,191 A | 3/2000 | Purnell | |
| 6,116,163 A * | 9/2000 | Mitchell | 108/42 |
| 6,227,387 B1 | 5/2001 | Rose | |
| 6,375,016 B1 * | 4/2002 | Stuchlik, III | 211/70.7 |
| 6,454,108 B1 * | 9/2002 | Gerard | 211/74 |
| 6,484,893 B1 * | 11/2002 | Tkatch | 211/94.02 |
| 6,679,392 B1 | 1/2004 | Costa | |
| 6,729,479 B2 | 5/2004 | Morgan | |
| 6,976,595 B1 | 12/2005 | Geller | |
| 7,007,808 B2 | 3/2006 | Morgan | |
| 7,104,409 B2 | 9/2006 | Morgan | |
| 7,121,413 B2 | 10/2006 | Morgan | |
| 7,490,424 B2 * | 2/2009 | Caterinacci | 40/606.14 |
| 7,604,131 B1 * | 10/2009 | Clark et al. | 211/17 |
| 7,766,290 B1 | 8/2010 | Bradbury | |
| 7,956,286 B2 * | 6/2011 | Furuichi | 174/69 |
| 8,028,844 B2 * | 10/2011 | Costa et al. | 211/96 |
| 8,074,812 B1 | 12/2011 | Bradbury | |
| 2003/0071001 A1 * | 4/2003 | Goldberg | 211/123 |
| 2008/0302745 A1 * | 12/2008 | Groll et al. | 211/124 |
| 2009/0272704 A1 * | 11/2009 | Wu | 211/113 |
| 2009/0294389 A1 | 12/2009 | Ward et al. | |
| 2010/0122963 A1 * | 5/2010 | Costa et al. | 211/94.01 |
| 2011/0000864 A1 | 1/2011 | Moore | |
| 2011/0266283 A1 | 11/2011 | Ernst et al. | |
| 2012/0199714 A1 * | 8/2012 | Rinaldo | 248/304 |
| 2012/0211449 A1 | 8/2012 | Newbauer | |
| 2013/0099073 A1 | 4/2013 | Bradbury | |
| 2013/0306817 A1 * | 11/2013 | Smed | 248/231.85 |

OTHER PUBLICATIONS

"Knape & Vogt Pot & Pan Pantry Pull-Out Cabinet Organizer," kitchensource.com, date unknown, 2 pages [retrieved from: http://www.kitchensource.com/cabinet-organizers/kv-pan1700tm.htm].

Jazmin "Image of Pull-out hanging pot/pan organizer," Jazmin on For the Home, date unknown, 4 pages [retrieved from: https://www.pinterest.com/pin/130182245451891338/].

Mike "DIY Cabinet Pan Rack," shelterness.com, Nov. 4, 2011, 9 pages [retrieved from: http://www.shelterness.com/diy-cabinet-pan-rack/].

U.S. Appl. No. 13/136,368, filed Jul. 29, 2011, Bradbury.

U.S. Appl. No. 29/491,483, filed May 21, 2014, Hall et al.

International Search Report and Written Opinion for International (PCT) Patent Application No. PCT/US2014/039158 mailed Oct. 3, 2014, 17 pages.

* cited by examiner

EXTENDABLE STORAGE DEVICE

CROSS-REFERENCE TO RELATED APPLICATIONS

This application is a continuation-in-part of U.S. patent application Ser. No. 29/491,483, filed May 21, 2014, and claims the benefit of priority under 35 U.S.C. §119(e) to U.S. Provisional Patent Application Ser. No. 61/826,408, filed May 22, 2013. The entire contents of each of the foregoing applications are incorporated herein by reference.

FIELD OF THE INVENTION

The invention relates to a storage device for storing items hanging on a fully extendable and retractable support, wherein the storage device may be attached to the underside of an existing horizontal surface, a vertical surface, or any other available surface.

BACKGROUND

A large number of items of cookware are frequently used in kitchens. The cookware can be of various sizes and types. Cooks generally prefer to have their cookware stored neatly where the cookware is easily accessible for use. However, kitchens generally have only a limited amount of storage space available and storing cookware efficiently without wasting storage space is a recurring problem. The storage problem is made more difficult because many types of cookware have delicate cooking surfaces or exteriors that are easily damaged or marred.

One method of storing cookware involves hanging pieces of cookware from racks that hang from a ceiling or wall. Pieces of cookware are also frequently hung from hooks attached to various surfaces including the inside of cabinet doors. Cookware is also often stacked on shelves or in deep drawers.

These methods of storing cookware have several shortcomings. Stacking cookware makes it difficult to retrieve a needed piece of cookware. When cookware is stacked it is hard to view an entire cookware collection to select the best piece of cookware for the task at hand. A needed piece of cookware can be difficult to locate because the needed piece may be hidden in the stack by unneeded pieces. Unneeded pieces of cookware must frequently be lifted and unstacked to reach the needed piece. After using a needed piece of cookware, other pieces of cookware must be moved again to return the needed piece to the stack. Additionally, stacking and unstacking cookware can damage cookware pieces with non-stick surfaces or decorative surfaces as the pieces bump and rub against each other, leading many cookware manufacturers to recommend against stacking of such cookware.

Hanging cookware from ceiling or wall racks also creates several problems. Dust and contaminates can accumulate on cookware hung from ceiling and wall racks in the open. Additionally, many consumers either lack the space for overhead or wall storage, or find these methods of storing cookware interfere with their movement in the kitchen. Ceiling racks can also allow items of cookware to bump against each other making noise and potentially damaging the cookware.

Consumers who have sufficient space for overhead or wall storage methods simply cannot reach a ceiling rack or a wall rack without an assistive device, or feel doing so is unsafe. Because some items of cookware are heavy or large, it is also difficult for many consumers to lift the cookware high enough to reach the ceiling rack or wall rack. Further, some consumers avoid overhead and wall storage methods because they prefer a clean, clutter-free look to their kitchen, and thus prefer that all items of cookware are stored within cabinets when not in use.

Using hooks attached to cabinet doors causes several problems. Cabinet doors are frequently thin and do not provide a strong mounting surface for a hook, limiting the weight of cookware items that may be stored. The doors and hinges used to mount the doors to a cabinet are also rarely designed to carry the extra weight of the cookware and can therefore be damaged when cookware is stored in this manner. Finally, each cabinet door used to hang cookware provides only a limited storage capacity. It may be necessary to open several cabinet doors to find the necessary item of cookware. Therefore, hanging items of cookware from a cabinet door is not a significant improvement over stacking.

Attempts have been made to overcome these storage, capacity, and damage problems with only limited success.

An extendable garment hanger is described in U.S. Pat. No. 1,132,190, which is incorporated herein by reference in its entirety. The garment hanger has a number of hooks spaced at fixed intervals on an extendable rack; however, the hooks cannot be moved or repositioned on the rack and additional hooks cannot easily be added to the rack.

A suspension device for clothing, curtains, and the like is generally described in U.S. Pat. No. 1,613,447, which is incorporated herein by reference in its entirety. The suspension device is attached under a shelf by two brackets. A hollow tubular rod with a longitudinal slot facing downward is held by the brackets. Hooks are inserted through an open end of the slot. The hooks are suspended from the slot and can slide length-wise along the slot. The open end of the slot is covered when the tubular rod is in position between the brackets and therefore it is not possible to insert or remove hooks without at least partially disassembling the device. Access to items suspended from the device is limited because the device cannot extend out of an interior space of a cabinet.

U.S. Pat. No. 1,814,692, which is incorporated herein by reference in its entirety, describes an extendable utensil rack comprising two telescoping tubular members, with the entire system mounted to the vertical wall of a cabinet. Hooks can only be added or removed by inserting them through the ends of the rack body before the rack is mounted to the wall or by detaching the rack body from the wall. In addition, mounting the rack to a vertical wall potentially limits the arrangement of pots and pans within the storage space, as the cookware is stored in relatively close proximity to the cabinet side-wall. Further, after the rack is mounted to a wall, the length of the rack is fixed. This design also prevents full extension of the rack from within the cabinet space.

An extendable cup rack is described in U.S. Pat. No. 2,606,666, which is incorporated herein by reference in its entirety. The cup rack includes a plurality of support arms having hook portions at opposite ends. However, the support arms and hooks are fixedly and firmly attached at their mid-portions to a hanger of the cup rack, thereby preventing adjustment, arrangement, and addition of hooks to best support various pieces of cookware. Further, because the hooks extend outward, perpendicular to the longitudinal axis of the rack, the rack may twist or be damaged if heavier items are hung from the support arms on one side of the rack rather than on the other side of the rack.

A pot mounting apparatus is described in U.S. Pat. No. 2,608,305, which is incorporated herein by reference in its entirety. The apparatus comprises a slidable panel with a vertical orientation from which hooks are fixed for holding pots. The hooks are attached to the panel by screws and are therefore not easily adjusted without disassembling and reconfiguring the device. The apparatus also includes wire racks which include hairpin shaped slots for gripping pots which could damage or scratch surfaces of cookware.

U.S. Pat. No. 2,611,492, which is incorporated herein by reference in its entirety, describes a support for hanging articles. The support is attached to an under side of a shelf and includes a recess with a slot for holding a ball end of a hook. The recess is not accessible from the top. Instead, the support includes a port through which hooks can be added or removed, but the port faces downward making it difficult to align the ball end with the port. Additionally, the support does not extend horizontally providing limited access to, and visibility of, articles hung therefrom.

An extendable closet rod is described in U.S. Pat. No. 2,757,804, which is incorporated herein by reference in its entirety. The closet rod includes a downward facing slot through which a hook of a hanger bracket extends. The slot is closed at the top. To add or remove a hanger bracket to the closet rod, an upper body portion of the bracket must be inserted through cuttouts formed in a lower wall at the ends of the closet rod. Further, because hanger brackets can only be added through the cuttouts, the order and arrangement of the hooks cannot be changed such that if a particular hanger bracket is damaged or requires replacement, several hanger brackets may first have to be removed before the particular hanger bracket can be removed.

A pivoting rack for utensils is described in U.S. Pat. No. 3,379,484, which is incorporated herein by reference in its entirety. The rack is secured within a kitchen cabinet by a vertical piano hinge. The rack includes pegboard panels that can swing out of a cabinet. However, cookware positioned between two of the panels is difficult to reach.

Another design for storing cookware is described in U.S. Patent Publication No. 2012/0211449, which is incorporated herein by reference in its entirety. This design comprises a horizontal rack assembly adapted to mount to slides within a cabinet. The rack includes two side bars and several cross bars. Hooks hang down from the rack for receiving pots and pans. Because of the width of this design, pots hanging from a center portion of the rack would be difficult to reach. Additionally, because the hooks can only be positioned from the side bars or cross bars, the lateral spacing and adjustment of the hooks is not possible.

Several designs include movable or telescoping members with downwardly hanging hooks for cookware. Examples are provided in U.S. Pat. No. 6,227,387, U.S. Pat. No. 6,976,595, and U.S. Patent Application Publication No. 2011/0000864, which are each incorporated herein by reference in their entirety. These designs do not allow the user to easily remove and/or add the hooks. Additionally, the extending rails of the '595 patent and the '864 publication cannot be fully extended from the inside of the cabinet, making access to the cookware stored at the back of the holder somewhat difficult.

An adjustable assembly for hanging cookware is described in U.S. Pat. No. 7,766,290, which is incorporated herein in its entirety. The adjustable assembly includes a hanger track. Hanger assemblies rest on the hanger track from hanger sliders. Although the hanger assemblies can rotate and slide freely along the hanger track, the track ends must be removed to add hanger assemblies to the hanger track. Further, because hanger assemblies can only be removed from the track ends, if a hanger assembly is damaged and the damaged hanger assembly and an undamaged hanger assembly is positioned between the damaged hanger assembly and the end, the undamaged hanger assembly must be removed before the damaged hanger assembly can be removed.

A rotary storage device for a corner cabinet is described in U.S. Pat. No. 8,074,812 which is also incorporated herein in its entirety. The device includes a hanging track enclosed by a track clamp. Both the track and the track clamp have an opening or slot facing downward and hooks project through the slot. However, the track and track clamp are both closed at the top. Therefore, additional hooks may only be added by feeding the hooks through the ends of the track and track clamp. But using this design, if a user wants to add a different type of hook in a particular position, other hooks may have to be removed and then reinserted into the track to achieve the desired arrangement.

U.S. Patent Application Publication No. 2013/0099073, which is incorporated herein by reference in its entirety, describes a retractable hanging assembly for cookware. The hanger assembly includes a hanger track section with a closed top and a track slot formed facing downward. Hanger assemblies are coupled to the hanger track section and cannot be added through the closed top of the hanger assembly.

Accordingly, there is an unmet need for a storage device that increases efficiency of storage space through the ability to fully extend from the storage space to provide improved access to stored items and which provides an improved ability to add or remove hooks without disassembly or removal of the storage device from the storage space and without first removing other hooks from the storage device.

SUMMARY OF THE INVENTION

Embodiments of the present invention contemplate a novel storage device that has a slot through a center piece of the storage device. Hooks can be added to, and removed from, the storage device by inserting the hooks through the slot from a top side of the center piece. Thus, the arrangement, position, and number of hooks associated with the storage device can be adjusted to most efficiently use available storage space without disassembly of the storage device, without removing the storage device from a surface to which the storage device is attached, and without first removing other hooks associated with the storage device.

It is another aspect of embodiments of the present invention to provide an improved and convenient method and device for the storage of cookware so that it is readily accessible for all potential users in a household, restaurant or institution.

It is a further objective of the present invention to provide a storage system that is easily modified by the user to store different items, by allowing easy access to the system components, without requiring that the system be disassembled into its component pieces.

It is a further objective of the present invention to allow for maximum utilization of the storage space, by providing a system that can be modified at will by the user to accommodate different shaped and sized items.

It is a further objective of the present invention to provide a system that allows easy access to all of the items being stored in the storage space, regardless of the stored item's position in the storage space (e.g. front, middle or back).

It is a further objective of the present invention to provide a system that keeps items from contacting each other, which minimizes damage to cookware surfaces and extends the life of the stored items.

It is another aspect of embodiments of the present invention to provide a storage device that fits within an interior space of a closet or a storage cabinet when the storage device is in a retracted position but that can extend fully from the interior space in an extended position.

It is still another aspect of the present invention to provide hooks that can be added to, or removed from, the storage device when the storage device is at least partially extended. The orientation of the lower end of the hooks can be rotated about a vertical axis of the hooks. Hooks of one or more types with different shapes and sizes can be used interchangeably to efficiently use limited storage space.

Thus, one aspect of the present invention provides a storage device. In a specific embodiment, the storage device comprises a first support piece and a second support piece aligned substantially parallel to the first support piece. A center piece is positioned between the first and second support pieces, the center piece comprising: a top surface opposite a bottom surface, a first side surface slidingly engaging the first support piece, a second side surface opposite the first side surface, the second side surface slidingly engaging the second support piece, and a slot formed in the center piece, the slot extending from the top surface of the center piece through the bottom surface of the center piece. The center piece is operable to slide between the first support piece and the second support piece from a retracted position substantially aligned between the first and second support pieces to an extended position protruding from between the first and second support pieces. The storage device includes a least one hook. The hook includes a base with a shank extending from the base and ending in a lower end opposite the base. The hook is disposed in the slot formed in the center piece with a lower surface portion of the base resting against the top surface of the center piece. The shank of the hook extends through the slot formed in the center piece and the lower end of the hook extends below the bottom surface of the center piece.

Additionally or alternatively, the storage device includes a front piece interconnected to a front portion of the center piece. The front piece has a width of about 3 inches to about 9.5 inches and a height of about 1.25 inches to about 3.25 inches.

The storage device can further comprise a top piece. The first support piece and the second support piece are interconnected to a lower surface portion of the top piece and the first and second support pieces are substantially perpendicular to the top piece. The top piece has a length of about 10 inches to about 30 inches and a width of about 3 inches to about 9.5 inches.

In one embodiment, first and second support pieces, the center piece, the top piece, and the front piece are made of wood and have a thickness of about 0.25 inch to about 1.25 inch.

In another embodiment, the storage device further comprises a first sliding assembly engaging the first side surface of the center piece and an interior surface of the first support piece and a second sliding assembly engaging the second side surface of the center piece and an interior surface of the second support piece. The first and second sliding assemblies have a retracted length of about 10 inches to about 28 inches and an extended length of about 20 inches to about 56 inches. In one embodiment, the first sliding assembly comprises a first fixed rail attached to the interior surface of the first support piece, a second fixed rail attached to the first side surface of the center piece, and a first sliding rail. The first sliding rail slidingly connects the first fixed rail with the second fixed rail. The second sliding assembly comprises a third fixed rail attached to the interior surface of the second support piece, a fourth fixed rail attached to the second side surface of the center piece, and a second sliding rail. The second sliding rail slidingly connects the third fixed rail to the fourth fixed rail.

In another embodiment, the storage device further comprises a mounting bracket adapted to be attached to a vertical mounting surface. The mounting bracket is interconnected to a back portion of the top piece of the storage device. In one embodiment, the mounting bracket includes an upper horizontal support piece and a lower horizontal support piece and the back portion of the top piece fits between the upper and lower support pieces and is supported by the lower horizontal support piece. The mounting bracket has a height of about 1 inch to about 6 inches and a width of about 4 inches to about 8.5 inches.

In one embodiment, first and second support pieces, the center piece, the top piece, the mounting bracket, and the front piece are made of wood and have a thickness of about 0.25 inch to about 1.25 inch.

In one embodiment, the center piece has a length of about 6 inches to about 28 inches, the center piece has a width of about 1 inch to about 7 inches, the center piece has a height of about 0.875 inch to about 2.875 inch, and the slot has a length of about 5 inches to about 27 inches. The first and second support pieces have a height of about 1 inch to about 3 inches and a length of about 9.25 inches to about 29.25 inches.

Additionally or alternatively, the slot further comprises a lower portion positioned below an upper portion. The upper portion of the slot is wider than the lower portion of the slot forming two ledges at a transition between the upper portion and the lower portion. The base of the hook can be positioned at least partially within the widened upper portion, and the lower surface portion of the base rests on top of ledges formed by the lower portion. A width of the lower portion of the slot is about 0.25 inch to about 0.75 inch. A width of the upper portion of the slot is about 0.75 inch to about 1.25 inches. The upper portion of the slot has a depth of about 0.25 inch to about 0.5 inch. In one embodiment, the upper portion of the slot has a width that varies over a depth of the upper portion, wherein a first width of a bottom of the upper portion is less than a second width of a top of the upper portion. In another embodiment, a cross-section of the upper portion of the slot has a generally U-shaped profile.

In one embodiment, the upper portion of the slot is continuous along a length of the slot. In another embodiment, the upper portion of the slot is spaced at a regular interval along a length of the slot and the upper portion of the slot forms at least one notch in the top surface of the center piece. The base of the at least one hook is positioned at least partially within the at least one notch.

In one embodiment, the base of the hook is square or round in shape. The base has a width of about 0.445 inch to about 1.445 inches, a thickness of about 0.25 inch to about 0.5 inch, and a length of between about 2 inches and about 8 inches. Additionally or alternatively, the corners and the edges of the hook base are rounded. In one embodiment, each of the horizontal edges of the hook base have a radius of about 0.05 inch. In another embodiment, each of the vertical edges of the hook base have a radius of about 0.1 inch. In one embodiment, a horizontal cross section of the shank of the hook has a generally square shape with sides having a length of about 0.35 inch to about 0.41 inch. In another embodiment, the hook is configured as a single unit. In still another embodiment, the shank is connected to the base using a connector selected from the group consisting of a pin, a screw, a nail, a weld and a monolith. In yet another embodiment, the shank extends through a void in the base and the shank can rotate with respect to the base. In one embodiment, the lower end of the hook includes a threaded extension adapted to threadably engage a threaded bore formed at a lower end of the shank to interconnect the lower end to the shank of the hook. In another embodiment, a material of the hook is selected from at least one of a wood, a plastic, and a metal.

Additionally or alternatively, one or more protrusions, such as bumps, ridges, spheres, pins, pyramids, and the like, are formed on a lower surface of the hook base and multiple recesses having a corresponding shape are formed on the ledges of the slot. In one embodiment, the hook base includes a magnetized material and strips of magnetic material are positioned within the slot.

In one embodiment, the hook includes a shank with a first lower end and a second lower end, the second lower end positioned on an opposite side of the shank from the first lower end. In another embodiment, the second lower end is positioned on the shank closer to the hook base than the first lower end. In still another embodiment, the second lower end and the first lower end are positioned substantially the same distance from the hook base.

In yet another embodiment, a hook includes a double-sided lower end pivotally attached to a shank. The lower end is adapted to hold straps of items. In still another embodiment, a hook includes a shank and one or more hooks fixed to the shank. In another embodiment, a hook includes a shank with one or more generally horizontal holders fixed to the shank. The horizontal holders have a length of less than about 2 inches and are substantially straight. In one embodiment, the horizontal holders have an upturned distal end.

In another embodiment, a hook includes a first hook base and a second hook base. A shank is fixedly attached to a lower surface of each of the first and second hook bases. A horizontal holder is fixedly attached to each of the shanks and is substantially horizontal. The hook has a length of about 10 inches to about 30 inches and a height of about 2 inches to about 7 inches. In one embodiment, a plurality of protrusions are formed at intervals on an upper surface of the horizontal holder. In another embodiment, a plurality of grooves are formed on the upper surface of the horizontal holder. The grooves have a width adapted to receive a clothes hanger and are formed at various angles transverse to a length of the horizontal holder. In still another embodiment, the horizontal holder includes a series of peaks and troughs adapted to prevent inadvertent and unintended movement of a clothes hanger along the length of the horizontal holder.

It is another aspect of the present invention to provide a method of manufacturing a storage device of the present invention. This includes, but is not limited to, a method generally comprising: (1) forming a top piece; (2) forming a first support piece and a second support piece; (3) interconnecting the first and second support pieces to a lower surface portion of the top piece, the first and second support pieces extending downwardly from the lower surface portion and aligned substantially perpendicular to the top piece; (4) forming a center piece, the center piece comprising a top surface opposite a bottom surface, a first side surface opposite a second side surface, and a slot, the slot extending from the top surface of the center piece through the center piece to the bottom surface; (5) forming a front piece; (6) interconnecting the front piece to a front portion of the center piece; (7) slidingly interconnecting the first side surface of the center piece to the first support piece; (8) slidingly interconnecting the second side surface of the center piece to the second support piece, the second support piece aligned substantially parallel to the first support piece, and the center piece operable to slide between the first and second support pieces from a retracted position substantially aligned between the first and second support pieces to an extended position protruding in front of the first and second support pieces; and (9) providing at least one hook configured to fit into the slot, the at least one hook comprising a base, a shank extending from the base, and a lower end opposite the base, a lower surface portion of the base resting against the top surface of the center piece, the shank extending through the slot in the center piece, and the lower end of the at least one hook extends below the bottom surface of the center piece. The slot in the center piece further comprises a lower portion positioned below an upper portion. The upper portion of the slot is wider than the lower portion of the slot. The base of the at least one hook is positioned at least partially within the widened upper portion and the lower surface portion of the base rests on top of ledges formed by the lower portion.

Yet another aspect of the present invention is to provide a method of storing an item with a storage device. The method includes, but is not limited to: (1) providing a storage device, the storage device comprising a top piece, a first support piece interconnected to a lower surface portion of the top piece, a second support piece interconnected to the lower surface portion of the top piece, the second support piece aligned substantially parallel to the first support piece, a center piece positioned between the first and second support pieces, the center piece having a top surface opposite a bottom surface, a first side surface slidingly engaging the first support piece, a second side surface opposite the first side surface, the second side surface slidingly engaging the second support piece, and a slot extending from the top surface of the center piece through the bottom surface of the center piece; (2) attaching the storage device to a mounting surface; (3) sliding the center piece to an at least partially extended position, wherein the center piece protrudes at least partially from a front of the mounting surface; (4) positioning at least one hook in the slot, wherein the at least hook comprises a base, a shank extending from the base, and a lower end opposite the base, wherein a lower surface portion of the base rests against the top surface of the center piece, wherein the shank extends through the slot in the center piece, and wherein the lower end of the at least one hook extends below the bottom surface of the center piece; and (5) hanging the item from the lower end of the at least one hook.

Additionally or alternative, attaching the storage device to a mounting surface may comprise (1) attaching a mounting bracket to a vertical surface of the mounting surface, the mounting bracket comprising a body portion with an upper horizontal support piece and a lower horizontal support piece fixed to a front surface portion of the body; (2) positioning a rear portion of the top piece between the upper and lower horizontal support pieces, wherein the top piece is supported by the lower horizontal support piece; and (3) driving a fastener through the top piece into a horizontal surface of the mounting surface. In one embodiment, the body portion of the mounting bracket has a height of about 2.5 inches to about 3.5 inches, a width of about 4 inches to about 8.5 inches, and a thickness of about 0.25 inch to about 1.25 inches. The upper and lower horizontal support pieces have a length of about 1 inch to about 1.5 inches, a width of about 2 inches to about 3 inches, and the upper and lower horizontal support pieces are separated by a distance of about 0.5 inch to about 1 inch. In one embodiment, the mounting surface is a surface of a cabinet.

It is another aspect of the present invention to provide a storage device of another embodiment of the present invention. The storage device includes a center piece comprising a top surface, a bottom surface opposite the top surface, a first side surface, a second side surface opposite the first side surface, and a slot extending from the top surface of the center piece through the bottom surface of the center piece. The storage device also includes at least one hook. The at least one hook comprises a base, a shank extending from a lower surface of the base, the shank ending in a lower end opposite the base. The at least one hook is disposed in the slot in the center piece with a lower surface portion of the base resting against the top surface of the center piece, the shank extends through the slot, and the lower end of the hook extends below the bottom surface of the center piece. The storage device further includes a sliding assembly engaging a mounting surface and one of the first side surface, the second side surface, the top surface, and the bottom surface of the center piece, wherein the center piece is operable to move in relation to the mounting surface from a retracted position to an extended position protruding beyond a front surface of the mounting surface.

In one embodiment, the mounting surface is an interior surface of a storage space. In the retracted position the center piece is within the storage space, and in the extended position the center piece protrudes out of the storage space. In another embodiment, the mounting surface is one of a vertical support piece and a horizontal support piece, wherein one of the vertical support piece and the horizontal support piece are fixed within an interior of a storage space, and wherein the vertical and horizontal support pieces have a width of about 1 inch to about 3 inches and a length of about 9.25 inches to about 29.25 inches. In yet another embodiment, the storage space is one of a cabinet, a desk, a closet, an underside of a countertop, and an underside of a table.

In one embodiment, the center piece has a length of about 6 inches to about 28 inches, a width of about 1 inch to about 7 inches, and a height of about 0.875 inch to about 2.875 inch.

In another embodiment, the slot has a length of about 5 inches to about 27 inches. In still another embodiment, the slot further comprises a lower portion positioned below an upper portion. A width of the lower portion of the slot is about 0.25 inch to about 0.75 inch, a width of the upper portion of the slot is about 0.75 inch to about 1.25 inches, and the upper portion of the slot has a depth of about 0.25 inch to about 0.5 inch. The base of the at least one hook is positioned at least partially within the widened upper portion, and the lower surface portion of the base rests on top of ledges formed by the lower portion.

In one embodiment, the base of the at least one hook is square or round in shape. In still another embodiment, the base has a width of about 0.445 inch to about 1.445 inches and a thickness of about 0.25 inch to about 0.5 inch. In yet another embodiment, the hook has a length of about 2 inches to about 8 inches. In another embodiment, each of the horizontal edges of the hook base have a radius of about 0.05 inch and each of the vertical edges of the hook base have a radius of about 0.1 inch. In yet another embodiment, a horizontal cross section of the shank of the hook has a generally square shape with sides having a length of about 0.35 inch to about 0.41 inch. In another embodiment, one or more bumps, ridges, spheres, pins, pyramids, and combinations thereof are formed on the lower surface of the hook base, and recesses having a corresponding shape are formed on the ledges of the slot. In another embodiment, the hook base of the at least one hook includes a magnetized material and a magnetic material is positioned within the slot of the centerpiece.

In still another embodiment, the sliding assembly has a retracted length of about 10 inches to about 28 inches, and the sliding assembly has an extended length of about 20 inches to about 56 inches.

Additionally or alternatively, the storage device can include a front piece interconnected to a front portion of the center piece, wherein the front piece has a width of about 3 inches to about 9.5 inches, and wherein the front piece has a height of about 1.25 inches to about 3.25 inches.

Another aspect of the present invention provides a storage device that has a generally cylindrical body. The storage device comprises a body comprising a generally cylindrical shape, a hollow interior, and a groove formed in a lower portion of the body. The storage device further comprises a center piece adapted to slidingly fit within the hollow interior of body. The center piece is operable to slide from a retracted position within the hollow interior of the body to an extended position protruding from the hollow interior. A slot is formed through the center piece, the slot having a generally vertical orientation, the slot extending along at least a portion of the length of the center piece, and a bottom portion of the slot aligning with the groove of the body. At least one hook positioned in the slot, the at least one hook comprising a base, a shank extending from the base and ending in a lower end opposite the base, the lower end protruding from the bottom portion of the slot and through the groove of the body and extending below the storage device.

Additionally or alternatively, the storage device may include one or more horizontal or vertical mounting brackets connected to an exterior surface of the body. In one embodiment, the body and the center piece have one of a cylindrical shape and an elliptical shape. In another embodiment, the body has a length of about 10 inches to about 30 inches, the center piece has a length of about 6 inches to about 28 inches, and the slot has a length of about 5 inches to about 27 inches. In one embodiment, the slot further comprises a lower portion positioned below an upper portion. A width of the lower portion of the slot is about 0.25 inch to about 0.75 inch, a width of the upper portion of the slot is about 0.75 inch to about 1.25 inches, and the upper portion of the slot has a depth of about 0.25 inch to about 0.5 inch. In still another embodiment, the storage device may include a handle interconnected to a front portion of the center piece.

Another aspect of the present invention provides a hook for a storage device. The hook comprises at least one base, the at least one base having a width of about 0.445 inch to about 1.445 inches, and the at least one base having a thickness of about 0.25 inch to about 0.5 inch. A shank extends down from a lower surface of the at least one base. At least one lower end extends from the shank, and the hook has a length of about 2 inches to about 8 inches. In one embodiment, the at least one base has a shape of one of a square, a rectangle, a circle, an oval, a polygon, a pentagon, a hexagon, and combinations thereof. In another embodiment, the horizontal edges of the at least one base have a radius of about 0.05 inch and the vertical edges of the at least one base have a radius of about 0.1 inch. In still another embodiment, a horizontal cross section of the shank of the hook has a generally square shape with sides having a length of about 0.35 inch to about 0.41 inch. In yet another embodiment, the shank can rotate with respect to the at least one base. In another embodiment, the at least one lower end comprises a first lower end and a second lower end, and the first lower end is positioned on an opposite side of the shank from the second lower end. In still another embodiment, the at least one base comprises a first base with a first shank and a second base with a second shank, a horizontal holder is fixedly attached to the first shank and the second shank, a length of the hook is about 10 inches to about 30 inches.

The above-described embodiments, objectives, and configurations are neither complete nor exhaustive. As will be appreciated, other embodiments of the invention are possible using, alone or in combination, one or more of the features set forth above or described in detail below.

This Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in this Summary of the Invention as well as in the attached drawings and the Detailed Description of the Invention and no limitation as to the scope of the present invention is intended by either the inclusion or non-inclusion of elements or components. Additional aspects of the present invention will become more readily apparent from the Detailed Description, particularly when taken together with the drawings.

BRIEF DESCRIPTION OF DRAWINGS

The accompanying drawings are incorporated into and form a part of the specification to illustrate examples of the aspects, embodiments, or configurations disclosed herein. These drawings together with the description, explain the principle of the aspects, embodiments, or configurations. The drawings simply illustrate preferred and alternative examples of how the aspects, embodiments, or configurations can be made and used and are not to be construed as limiting the aspects, embodiments, or configurations to only the illustrated and described examples. Further features and advantages will become apparent from the following, more detailed, description of the various aspects, embodiments, or configurations, as illustrated by the drawings referenced below. Reference numbers are the same for those elements that are the same across different Figures.

Figure 1:
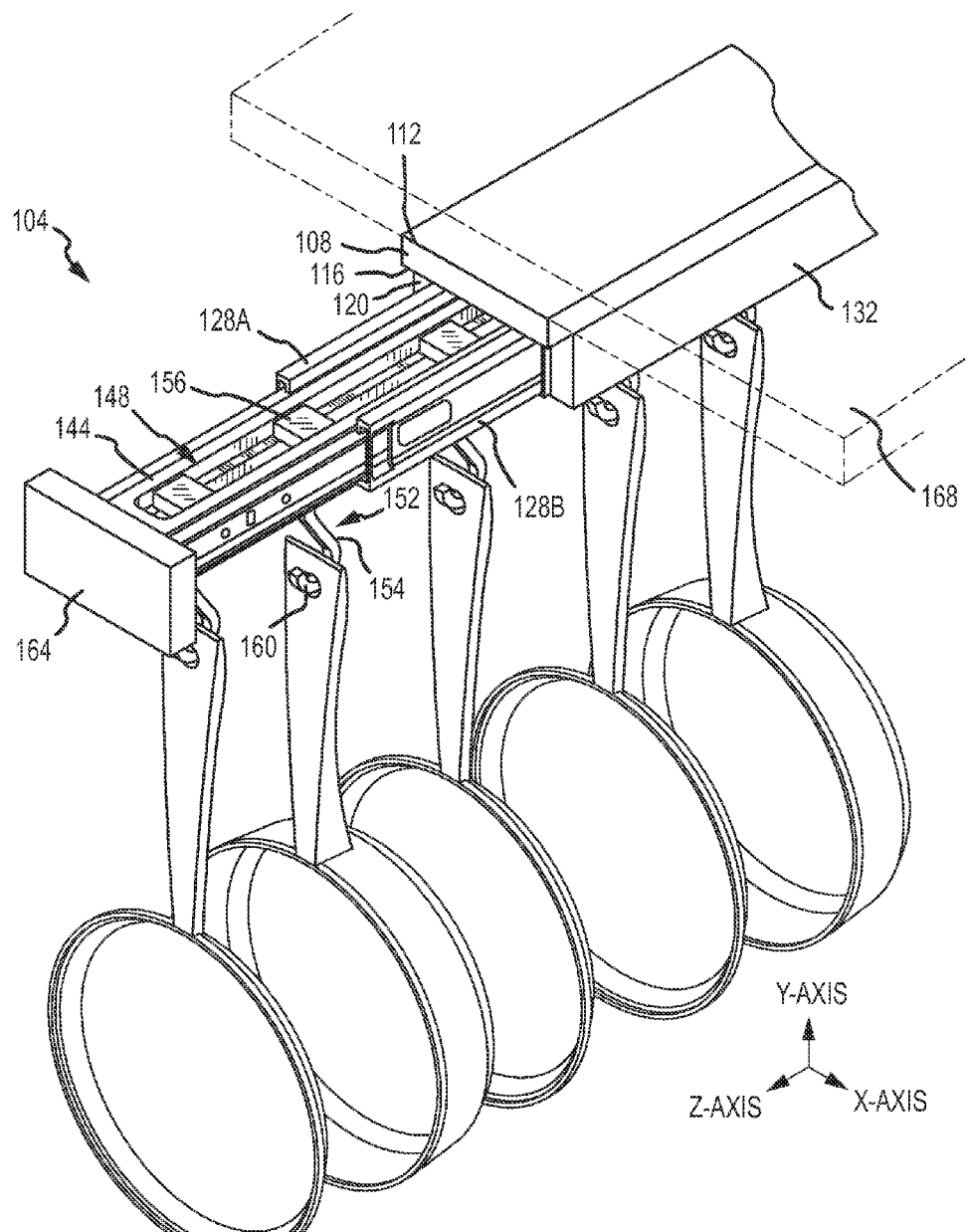
FIG. 1 is a perspective view of a storage device according to one embodiment of the present invention.

To assist in the understanding of embodiments of the present invention, the following list of components and associated numbering found in the drawings is provided herein:

| Number | Component |
|---|---|
| 104 | Storage device |
| 108 | Top piece |
| 109 | Length of top piece |

-continued

| Number | Component |
| --- | --- |
| 110 | Width of top piece |
| 112 | Upper surface |
| 116 | Lower surface |
| 119 | Height of support pieces |
| 120 | First support piece |
| 121 | Length of support pieces |
| 128 | Sliding assembly |
| 132 | Second support piece |
| 140 | Center piece height |
| 141 | Depth of upper portion of slot |
| 142 | Center piece length |
| 143 | Center piece width |
| 144 | Center piece |
| 147 | Slot length |
| 148 | Slot |
| 149 | Notch |
| 150 | Slot width |
| 152 | Hook |
| 154 | Hook shank |
| 156 | Hook base |
| 160 | Hook lower end |
| 163 | Height of front piece |
| 164 | Front piece |
| 168 | Mounting surface |
| 172 | Ledge |
| 504 | Storage device |
| 508 | Top piece |
| 510 | Width of top piece |
| 522 | Exterior surface of first support piece |
| 534 | Exterior surface of second support piece |
| 544 | Center piece |
| 548 | Slot |
| 572 | Ledges |
| 604 | Storage device |
| 620 | First support piece |
| 624 | Interior surface of first support |
| 628 | Sliding assembly |
| 632 | Second support piece |
| 636 | Interior surface of second support |
| 644 | Center piece |
| 648 | Slot |
| 668 | Mounting surface |
| 670 | Lower surface |
| 672 | Ledges |
| 704 | Storage device |
| 708 | Top piece |
| 716 | Lower surface of top piece |
| 720 | First support piece |
| 728 | Sliding assembly |
| 744 | Center piece |
| 745 | Left side |
| 746 | Right side |
| 748 | Slot |
| 768 | Mounting surface |
| 770 | Lower surface |
| 772 | Ledges |
| 774 | Horizontal support piece |
| 804 | Storage device |
| 828 | Sliding assembly |
| 844 | Center piece |
| 845 | Left side |
| 846 | Right side |
| 848 | Slot |
| 868 | Mounting surface |
| 870 | Lower surface |
| 871 | Vertical surface |
| 872 | Ledges |
| 904 | Storage device |
| 944 | Center piece |
| 948 | Slot |
| 965 | Handle |
| 972 | Ledges |
| 975 | Mounting brackets |
| 976 | Cylindrical body |
| 977 | Length of cylindrical body |
| 978 | Slot in cylindrical body |
| 1029 | Fixed rails |
| 1030 | Sliding rail |
| 1031 | Soft close mechanism |
| 1071 | Vertical surface |
| 1180 | Mounting bracket |
| 1181 | Support piece |
| 1251 | Hook attachment |
| 1252 | Hook |
| 1254 | Shank |
| 1256 | Hook base |
| 1260 | Lower end |
| 1262 | Threaded bore |
| 1266 | Threaded extension |
| 1282 | Hook base width |
| 1283 | Hook length |
| 1284 | Protrusion |
| 1285 | Recess |
| 1286 | Hook base thickness |
| 1452 | Double hook |
| 1454 | Shank |
| 1456 | Hook base |
| 1460A | First lower end |
| 1460B | Second lower end |
| 1552 | Back-to-back hook |
| 1554 | Shank |
| 1556 | Hook base |
| 1560A | First lower end |
| 1560B | Second lower end |
| 1652 | Strapped item hook |
| 1654 | Shank |
| 1656 | Hook base |
| 1660 | Lower end |
| 1752 | Hat hook |
| 1754 | Shank |
| 1756 | Hook base |
| 1757 | Hook |
| 1852 | Tie hook |
| 1854 | Shank |
| 1856 | Hook base |
| 1858 | Holder |
| 1952 | Clothes hook |
| 1953 | Length |
| 1954 | Shank |
| 1955 | Height |
| 1956 | Hook base |
| 1958 | Holder |
| 1959 | Protrusions |
| 1961 | Grooves |

It should be understood that the drawings are not necessarily to scale. In certain instances, details which are not necessary for an understanding of the invention or which render other details difficult to perceive may have been omitted. It should be understood that the invention is not necessarily limited to the particular embodiments illustrated herein.

DETAILED DESCRIPTION

Various embodiments of the present invention are described herein and depicted in the drawings. To acquaint persons skilled in the pertinent arts most closely related to the present invention, a preferred embodiment that illustrates the best mode now contemplated for putting the invention into practice is described herein by, and with reference to, the annexed drawings that form a part of the specification. This exemplary embodiment is described in detail without attempting to describe all of the various forms and modifications in which the invention might be embodied. As such, the embodiments described herein are illustrative and, as will become apparent to those skilled in the arts, may be modified in numerous ways within the scope and spirit of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

The term "hook" as used herein refers to any element designed to hold any type of item in a hanging relationship. Hooks of the present invention are of various sizes and materials and are not limited to a "J" shape. Thus, hooks of the present invention can include one or more hanging surfaces. A hook can be double sided and/or can include multiple hanging surfaces in a vertical relationship. Additionally or alternatively, hooks of the present invention can be adapted to hold various different items. For example, hooks of the present invention can be used to hold items of cookware (such as pots, pans, lids, cups, etc.), utensils (including cooking utensils, brooms, mops, dusters, dust pans, shovels, rakes, squeegees, gardening tools, and the like), clothing and accessories (for example, hats, ties, belts, purses, handbags, scarves, clothes hangers, and similar items), tools, and recreational equipment (such as rackets, backpacks, hiking gear, etc.).

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

Referring now to FIG. 1, a storage device 104 of one embodiment of the present invention is illustrated in a partially extended configuration. The storage device 104 has a top piece 108 with an upper surface 112 and a lower surface 116. A first support piece 120 extends down from the lower surface 116 substantially perpendicular to the top piece 108. A first sliding assembly 128A is fixed to an interior surface of the first support piece 120, the first sliding assembly 128A is substantially parallel to a Z-axis of the storage device 104.

A second support piece 132 extends down from the lower surface 116 substantially perpendicular to the top piece 108. The second support piece 132 is substantially parallel to the first support piece 120 and the Z-axis. A second sliding assembly 128B is fixed to an interior surface of the second support piece 132 and the second sliding assembly 128B is substantially parallel to the Z-axis.

A center piece 144 is slidably connected to the first and second sliding assemblies 128A, 128B. The center piece 144 is capable of sliding between the first and second supports 120, 132 from a retracted position substantially aligned between the first and second supports 120, 132 (illustrated in FIG. 3) to an extended position protruding from between the first and second supports 120, 132 and in front of a mounting surface 168 to which the storage device 104 is attached. As will be appreciated by one of skill in the art, the mounting surface may be any vertical or horizontal surface or structure, such as a rail, stile, countertop, or desktop, and can include any interior surface of a cabinet, closet, cupboard, enclosed storage space, and the like.

A slot 148 is formed through the center piece 144 and extends along a portion of the length of the center piece substantially parallel to the Z-axis. One or more hooks 152 are releasably positioned through the slot 148 of the center piece 144. The hooks 152 can have a variety of shapes. The hooks 152 have a base 156 adapted to be releasably retained in the slot 148. A lower end 160 of the hooks 152 is adapted to hold any type of item in a hanging relationship with the storage device 104 as described in more detail below.

Additionally or alternatively, a front piece 164 can be interconnected to the center piece 144. Optionally, the front piece 164 can be integrally formed with the center piece 144. A finger-pull may be attached to, or formed in, the front piece 164. The finger-pull may be selected from the group consisting of a lever, a knob, a hook, a handle, an indent, and any other suitable device that can be grabbed or grasped by a user to pull the center piece 144 to an extended position, or conversely pushed to retract the center piece 144.

The top-piece 108, first and second support pieces 120, 132, center piece 144, and the front piece 164 can be made of a material selected from the group consisting of wood, plastic, metal, and combinations thereof. Additionally or alternatively, one or more pieces 108, 120, 132, 144, and 164 can be made of different materials compared to the other pieces. In one preferred embodiment, the pieces 108, 120, 132, 144, and 164 are made of wood.

In operation, the storage device 104 is connected to a desired mounting surface 168. In one embodiment, as illustrated in FIG. 1, the upper surface 112 of the top piece 108 is fixed to a horizontal frame element or directly to a lower surface portion of a countertop 168 of a cabinet. One or more fasteners, such as a screw or a nail, may be driven through the top piece 108 into a horizontal mounting surface 168. Additionally or alternatively, either the first support piece 120 or the second support piece 132 can be fixed to a vertical mounting surface 168. The attachment between the storage device 104 and the mounting surface 168 can include the use of mechanical fasteners (such as screws, nails, and/or staples), adhesives (for example wood glue), straps, brackets, and/or any other means known to those of skill in the art. In one embodiment, at least one screw is driven from the lower surface 116 of the top piece 108 into a horizontal frame element 168 of a cabinet.

Figure 2:
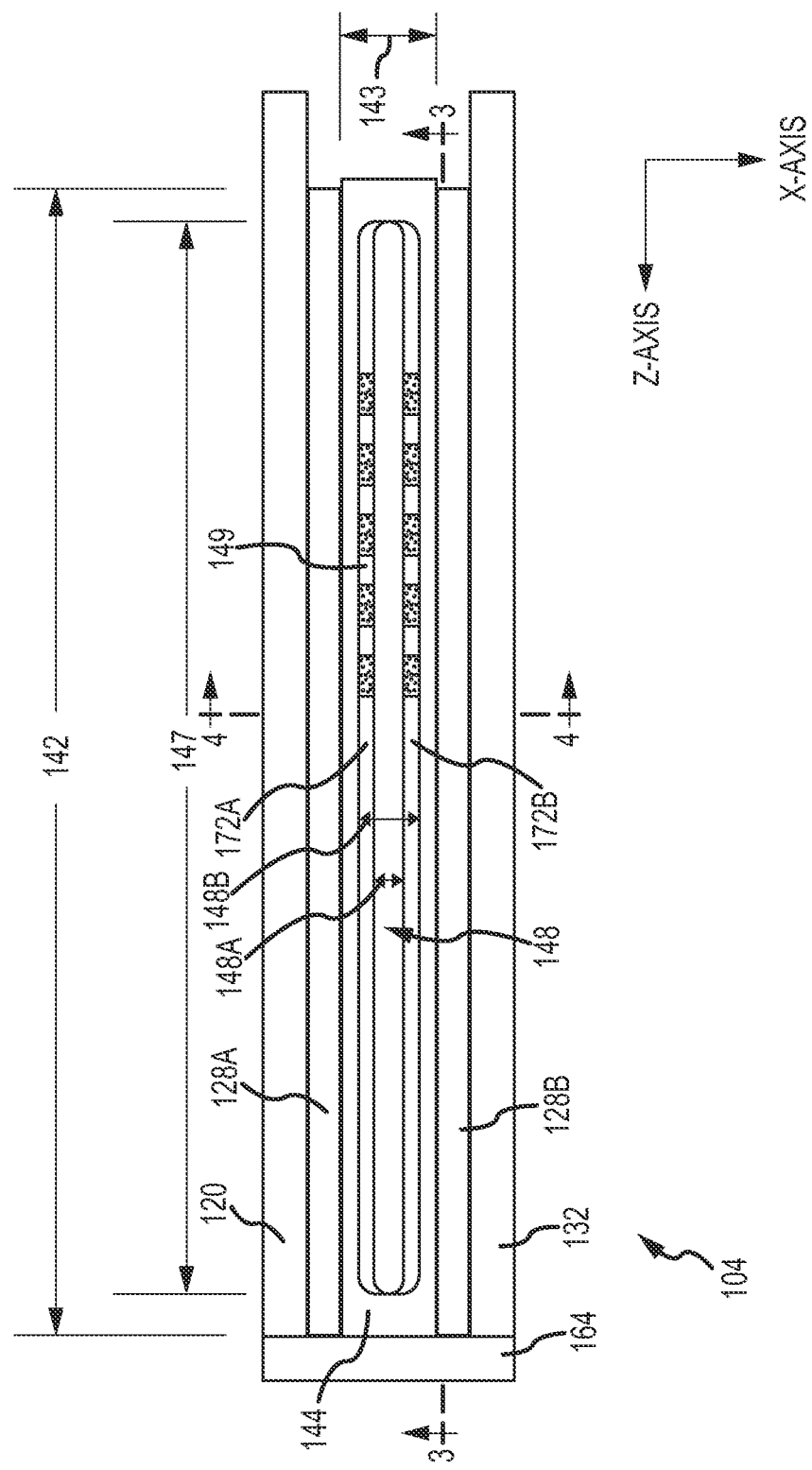
FIG. 2 is a top plan view of the storage device of FIG. 1 with the top piece removed for clarity.

Referring now to FIG. 2, a top plan view of the storage device 104 of FIG. 1 is illustrated with the top piece 108 removed for clarity. In some embodiments, the center piece 144 has a length 142 (along the Z-axis) that is about equal to or less than the depth of a cabinet in which the storage device is attached. A longer center piece length makes a larger percentage of the storage space available for storing items. The length 142 of the center piece 144 is between approximately 6 inches and approximately 28 inches. In one embodiment, the length 142 of the center piece 144 is between approximately 7.75 inches and approximately 23 inches. In a more preferred embodiment, the length 142 of the center piece 144 is between approximately 18.5 inches and approximately 22 inches. In a still more preferred embodiment, the length 142 is approximately 19.75 inches.

The center piece 144 has a width 143 of between approximately 1 inch and approximately 7 inches. In one embodiment, the width 143 of the center piece 144 is between approximately 1.5 inches and approximately 2 inches. In a more preferred embodiment, the width 143 of the center piece 144 is approximately 1.75 inches.

As illustrated in FIG. 2, the slot 148 comprises a lower portion 148A that is narrower than an upper portion 148B. The slot 148 is described in more detail in conjunction with FIG. 4. The upper portion 148B forms shoulders or ledges 172A, 172B above the lower portion 148A. The upper portion 148B may be continuous along a length of the slot 148. Additionally or alternatively, the upper portion 148B may be formed at regular intervals along the length of the slot, forming a series of notches 149 with a size and shape adapted to receive a hook base 156 positioned inside the notch. In operation, the hook base 156 of a hook 152 may fit within the upper portion 148B and be supported by the ledges 172A, 172B.

The slot 148 is defined by a length 147 that is about equal to or less than the length 142 of the center piece 144. As will be recognized, a longer slot length 147 results in the ability to use a larger number of hooks 152, and thus maximizes the usage of the existing storage volume. In one embodiment, the length 147 of the slot 148 is between approximately 5 inches and approximately 27 inches. In another embodiment, the length 147 of the slot 148 is between approximately 16.125 inches and approximately 20.125 inches. In a more preferred embodiment, the length 147 is approximately 18.125 inches.

Figure 3:
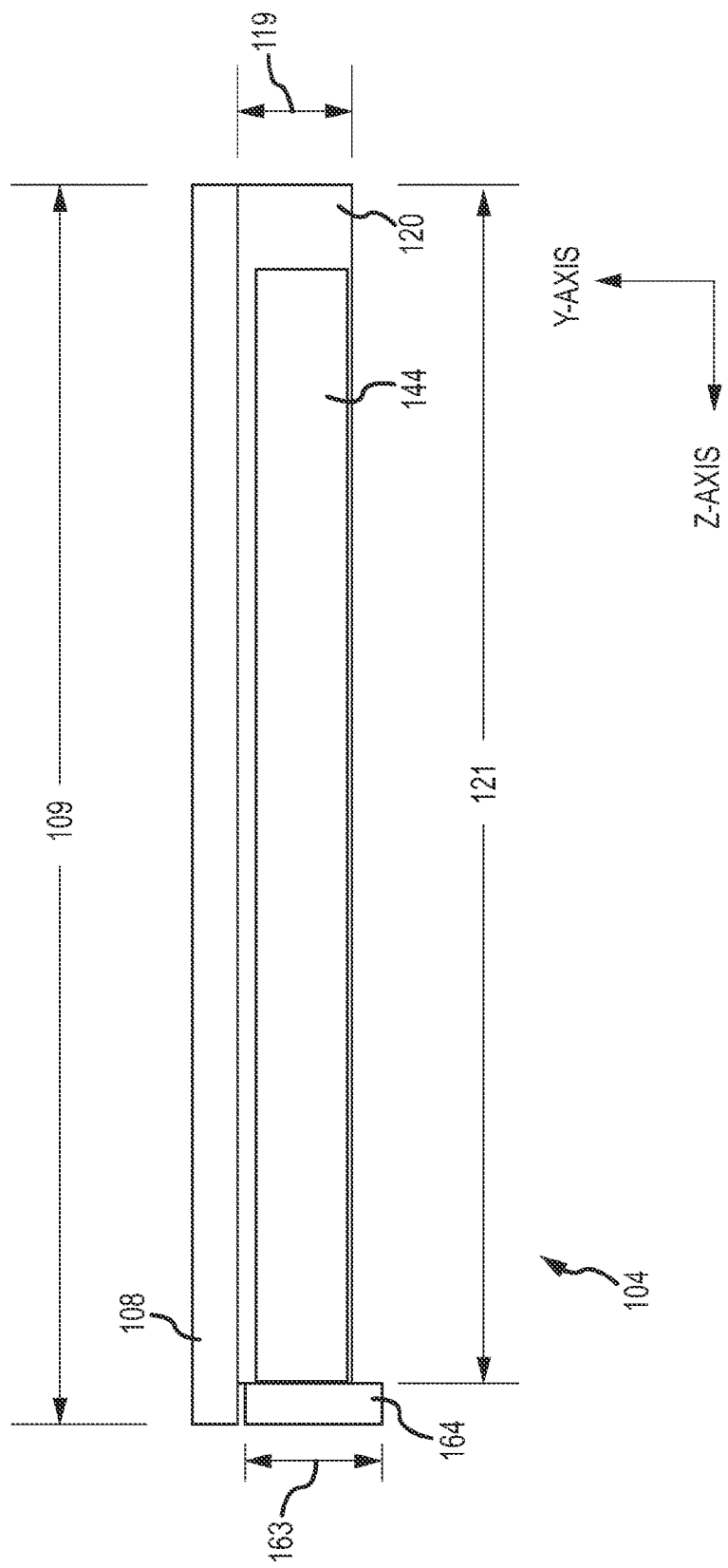
FIG. 3 is a cross-sectional side elevation view of the storage device of FIG. 2 taken along line 3 and including the top piece.

Referring now to FIG. 3, a cross-sectional side elevation view of the storage device 104 taken along line 3 of FIG. 2 is illustrated including the top piece 108. The top piece 108 has a length 109 (along the Z-axis) about equal to or less than a depth of a cabinet to which the storage device 104 is interconnected such that the storage device 104 may be positioned entirely within the interior storage space defined by the cabinet. The interior storage space of the cabinet is defined by a height (Y-axis), a width (X-axis), and a depth (Z-axis).

The length 109 of the top piece 108 is between approximately 10 inches and approximately 30 inches. In one embodiment, the length 109 of the top piece 108 is between approximately 19 inches and approximately 25 inches. In a more preferred embodiment, the length 109 of the top piece 108 is between approximately 21 inches and approximately 23 inches. The length 109 is approximately 22 inches in a still more preferred embodiment. In still another embodiment, the length 109 of the top piece 108 is greater than the length 142 of the center piece 144 and the length 121 of the first and second support pieces 120, 132.

The first and second support pieces 120, 132 have a length 121 of between approximately 9.25 inches and approximately 29.25 inches. In one embodiment, the length 121 of the first and second support pieces 120, 132 is between approximately 18.25 inches and approximately 24.25 inches. In a more preferred embodiment, the length 121 of the support pieces 120, 132 is between approximately 20.25 inches and approximately 22.25 inches. In a still more preferred embodiment, the length 121 is approximately 21.25 inches. In yet another embodiment, the length 121 of the first and second support pieces 120, 132 is greater than the length 142 of the center piece 144.

The first support and second support pieces 120, 132 have a width such that the support pieces 120, 132 provide sufficient mechanical structure for attachment to the existing surface and to support the weight of the stored items and of the storage device 104. In one embodiment, the first and second support pieces 120, 132 have a width of between approximately 0.5 inch and 1 inch. In a more preferred embodiment, the first and second support pieces 120, 132 have a width of approximately 0.75 inch.

A height 119 of the first and second support pieces 120, 132 is such that there is sufficient surface area to attach the first and second sliding assemblies 128A, 128B. In one embodiment, the height 119 of the first and second support pieces 120, 132 is greater than a height of the center piece 144. In another embodiment, the height 119 of the first and second support pieces 120, 132 is between approximately 1 inch and approximately 3 inches. In a more preferred embodiment, the height 119 is between approximately 1.5 inches and approximately 2.25 inches. In a more preferred embodiment, the height 119 is approximately 1.875 inches. In one embodiment, the width of the first and second support pieces 120, 132 is greater than the height 119. In another embodiment, the height 119 of the first and second support pieces 120, 132 is greater than the width.

The front piece 164 has a height 163 of between about 1.25 inches and 3.25 inches. The height 163 is about 2.25 inches in a more preferred embodiment.

Figure 4:
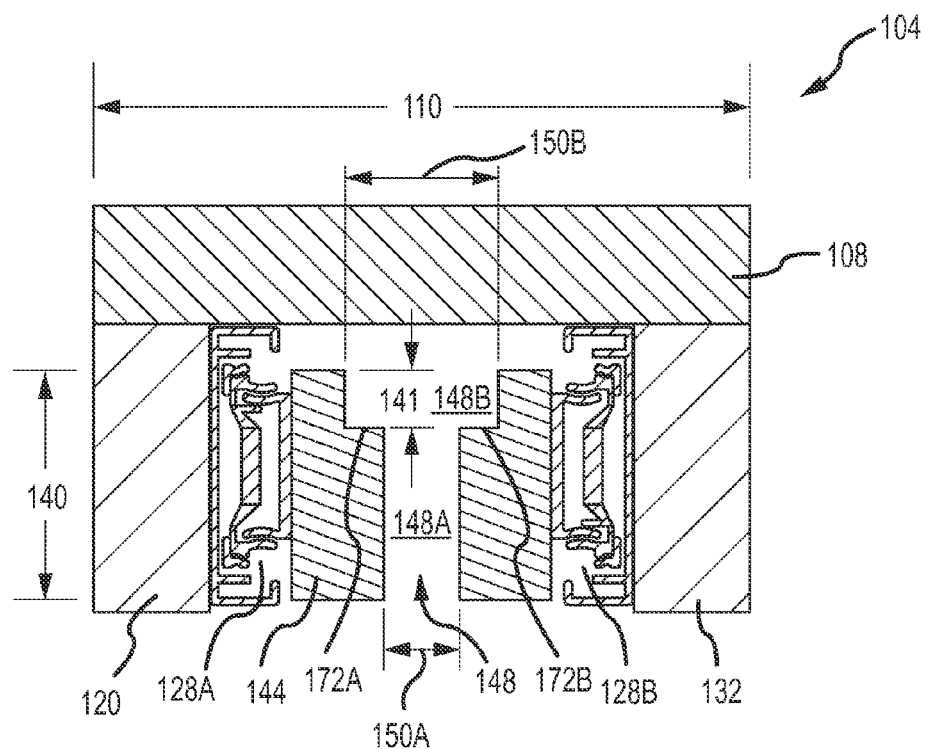
FIG. 4 is a cross-sectional front elevation view of the storage device of FIG. 2 taken along line 4 and including the top piece.

Referring now to FIG. 4, a cross-sectional front elevation view of the storage device 104 taken along line 4 of FIG. 2 is illustrated including the top piece 108. The top piece 108 has a width 110 between about 3 inches and about 9.5 inches. In a more preferred embodiment, the width 110 of the top piece 108 is between about 3.25 inches and about 5.25 inches. In a still more preferred embodiment, the width 110 is about 4.25 inches. The front piece 164 has a width substantially equal to the width 110 of the top piece 108. The width of the front piece is between about 3 inches and about 9.5 inches. In a preferred embodiment, the width of the front piece 164 is between about 3.25 inches and about 5.25 inches. The width of the front piece 164 is about 4.25 inches in a more preferred embodiment.

The center piece 144 has a height 140 of between approximately 0.875 inch and approximately 2.875 inch. In a preferred embodiment, the height 140 is between approximately 1.25 inch and approximately 1.75 inch. The height 140 of the center piece 144 is approximately 1.5 inch in a more preferred embodiment.

The slot 148 in the center piece 144 has a width 150A in the lower portion 148A that is sufficient to allow a shank 154 and lower end 160 of a hook 152 to pass through the slot 148. In one embodiment, the width 150A of the lower portion 148A is between approximately 0.25 inch and 0.75 inch. In a more preferred embodiment, the width 150A of the lower portion 148A is approximately 0.5 inch. The width 150A is less than a width 150B of the upper portion 148B of the slot. The width 150B of the upper portion 148B is between about 0.75 inch and 1.25 inches. The width 150B is approximately 1 inch in a more preferred embodiment.

The upper portion 148B of the slot 148 has a depth 141 of between about 0.25 inch and 0.5 inch. The depth 141 is about 0.375 inch in a more preferred embodiment. The ledges 172A, 172B of the slot 148 are illustrated in FIG. 4 as having substantially horizontal surfaces substantially parallel to the X-axis. However, the ledges 172A, 172B and the slot 148 can have any shape adapted to support or engage the hook base 156 while allowing the hook lower end 160 to pass through the slot 148. The cross-sectional profile of the slot 148 may be a square, a rectangle, a T-shape, an inverted cone, or any other applicable shape that allows the hook 152 to pass completely through the slot 148 while simultaneously providing a surface upon which the base 156 of the hook 152 may rest. For example, in one embodiment the ledges 172A, 172B have slopping walls forming a cross-sectional shape resembling an inverted cone. In another embodiment, the ledges have curvilinear profiles resembling an upward opening U, as illustrated in FIG. 5.

Figure 5:
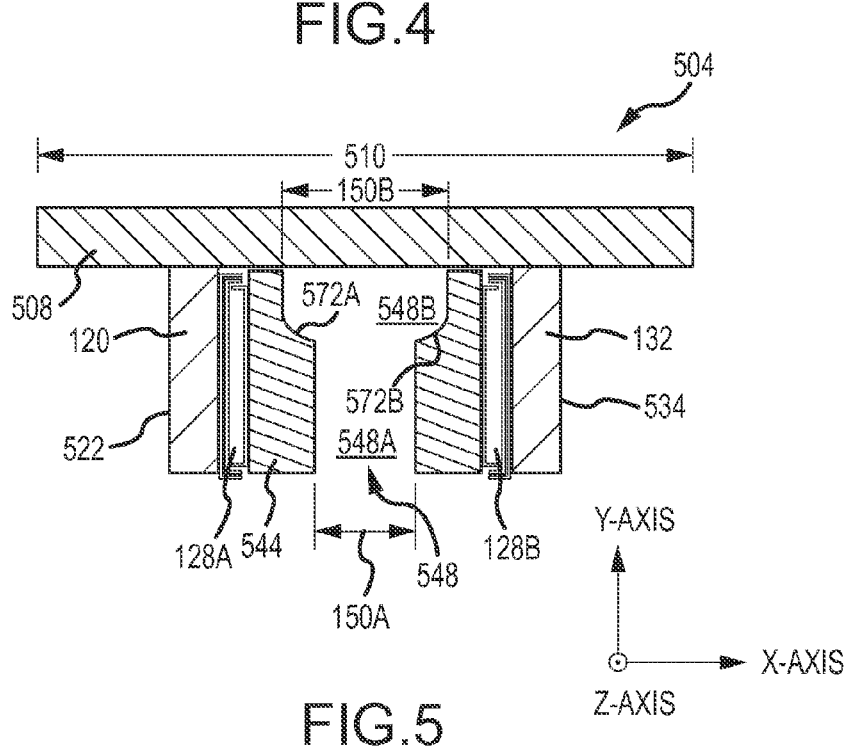
FIG. 5 is a cross-sectional front elevation view of a storage device according to one embodiment of the present invention.

Referring now to FIG. 5, another embodiment of a storage device 504 of the present invention is illustrated in a cross-sectional front elevation view. The center piece 544 has a slot 548 with rounded ledges 572A, 572B in the upper portion 548B and a narrower lower portion 548A. The width 150A of the lower portion 548A is the same or similar to width 150A of lower portion 148A. The maximum width 150B of upper portion 548B is the same or similar to width 150B of upper portion 148B. The center piece 544 has a length and a width the same or similar as the length 142 and width 143 of center piece 144.

The top piece 508 has a width 510 that extends past the exterior surface 522 of the first support piece 120 and past the exterior surface 534 of the second support piece 132. The width 510 of the top piece 508 is between approximately 4.25 inches and approximately 10.25 inches. In one embodiment, the top piece 508 has a width 510 of between approximately 5.25 inches and approximately 9.25 inches.

Figure 6A:
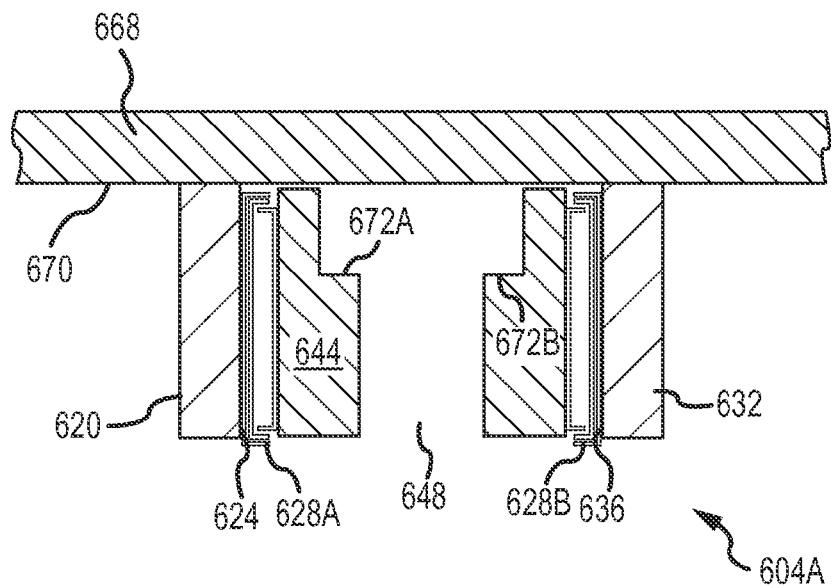
FIG. 6A is a cross-sectional front elevation view of a storage device according to another embodiment of the present invention.

Referring now to FIG. 6A, a cross-sectional front elevation view of another embodiment of a storage device 604A is illustrated with the front piece removed. A first support piece 620 has a first sliding assembly 628A interconnected to an interior surface 624 of the first support piece 620. A second support piece 632 is substantially parallel to the first support piece 620. A second sliding assembly 628B is interconnected to an interior surface 636 of the second support piece 632. The first and second support pieces 620, 632 have the same or similar dimensions, lengths, and widths as first and second support pieces 120, 132.

A center piece 644 is slidably engaged by the first and second sliding assemblies 628A, 628B. The center piece 644 has the same or similar dimensions as the center piece 144. Additionally or alternatively, a slot 648 with ledges 672A, 672B is formed in the center piece 644. The slot 648 and ledges 672 are similar to the slot 148 and ledges 172 and have the same or similar dimensions and shapes.

Figure 6B:
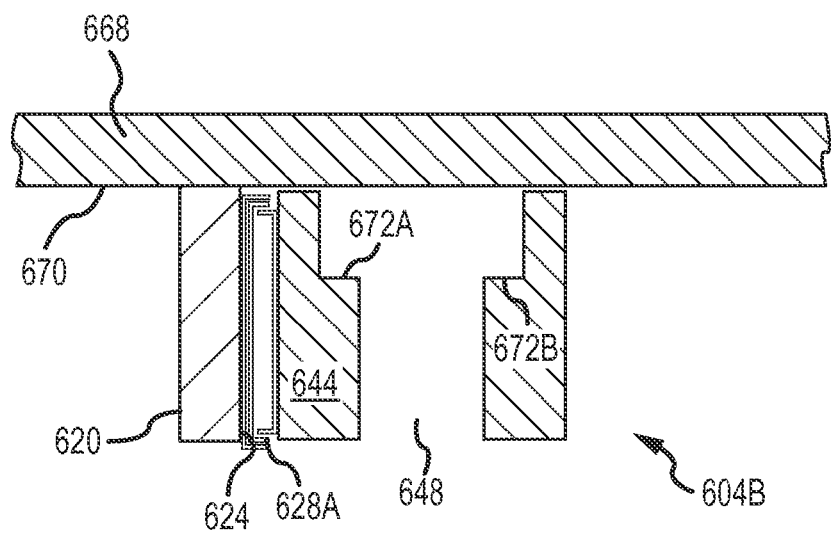
FIG. 6B is a cross-sectional front elevation view of a storage device according to yet another embodiment of the present invention.

As illustrated in FIG. 6B, optionally, the center piece 644 of the storage device 604B can be interconnected to a first sliding assembly 628A and a first support piece 620 without a second support piece or a second sliding assembly.

The storage devices 604A, 604B are positioned beneath a lower surface 670 of a cabinet or mounting surface 668. In one embodiment, the storage devices 604A, 604B are interconnected to the lower surface 670 using fasteners such as screws. Additionally or alternatively, the storage devices 604A, 604B can include a front piece (not illustrated) the same as, or similar to, front piece 164.

Figure 7A:
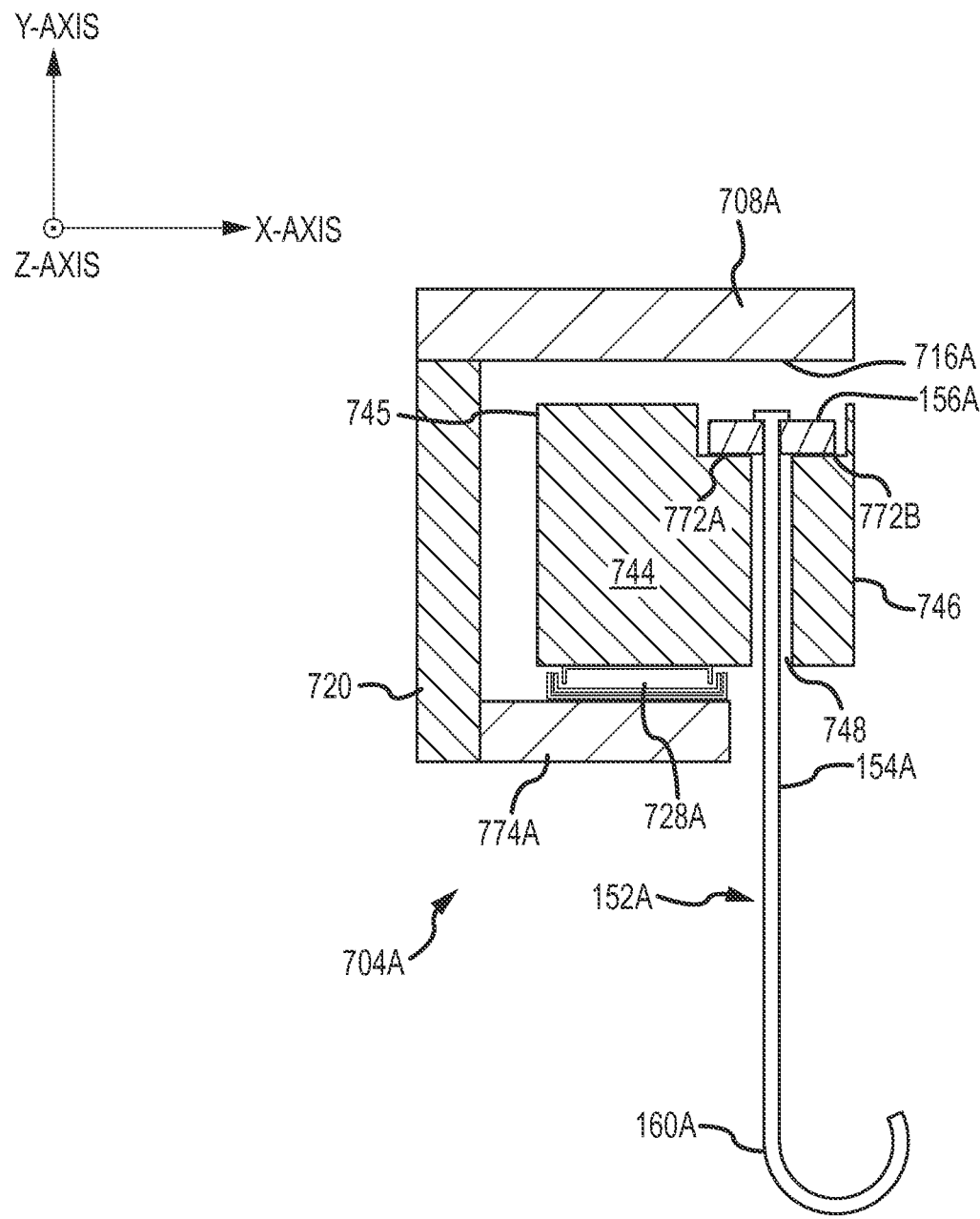
FIG. 7A is a cross-sectional front elevation view of another embodiment of a storage unit of the present invention.

Referring now to FIG. 7A, a cross-sectional front elevation view of another embodiment of a storage device 704A is illustrated. The storage device 704A comprises a first support piece 720 arranged vertically with a length substantially parallel to the Z-axis. A horizontal support piece 774A is fixedly connected to the first support piece 720 at a substantially right angle. A sliding assembly 728A is interconnected to an upper surface of the horizontal support piece 774A. A center piece 744 is slidably interconnected to the horizontal support piece 774A by the sliding assembly 728A. The center piece 744 is adapted to slide relative to the first support piece 720 and the horizontal support piece 774A from a retracted position substantially aligned between the first support piece 720 and the horizontal support piece 774A to an extended position protruding in front of the first support piece 720 and the horizontal support piece 774A.

The center piece 744 has the same or similar dimensions as center piece 144. The center piece 744 comprises a top surface opposite a bottom surface, a left side surface 745 facing the first support piece 720, and a right side surface 746 opposite the first side surface. A slot 748 with ledges 772A, 772B, with dimensions similar to or the same as slot 148 and ledges 172A, 172B, is formed in the center piece 744. The slot 748 extends from the top surface of the center piece 744 through the bottom surface of the center piece 744. The slot 748 may be formed closer to the right side surface 746 than to a center of the center piece 744. At least one hook 152A is disposed in the slot 748 with the base 156A resting against the ledges 772A, 772B and the lower end 160A extending below the bottom surface of the center piece 744. The shank 154A extends through a bore of the hook base 156A and the shank 154A can swivel or rotate relative to the hook base 156A about the Y-axis.

Figure 7B:
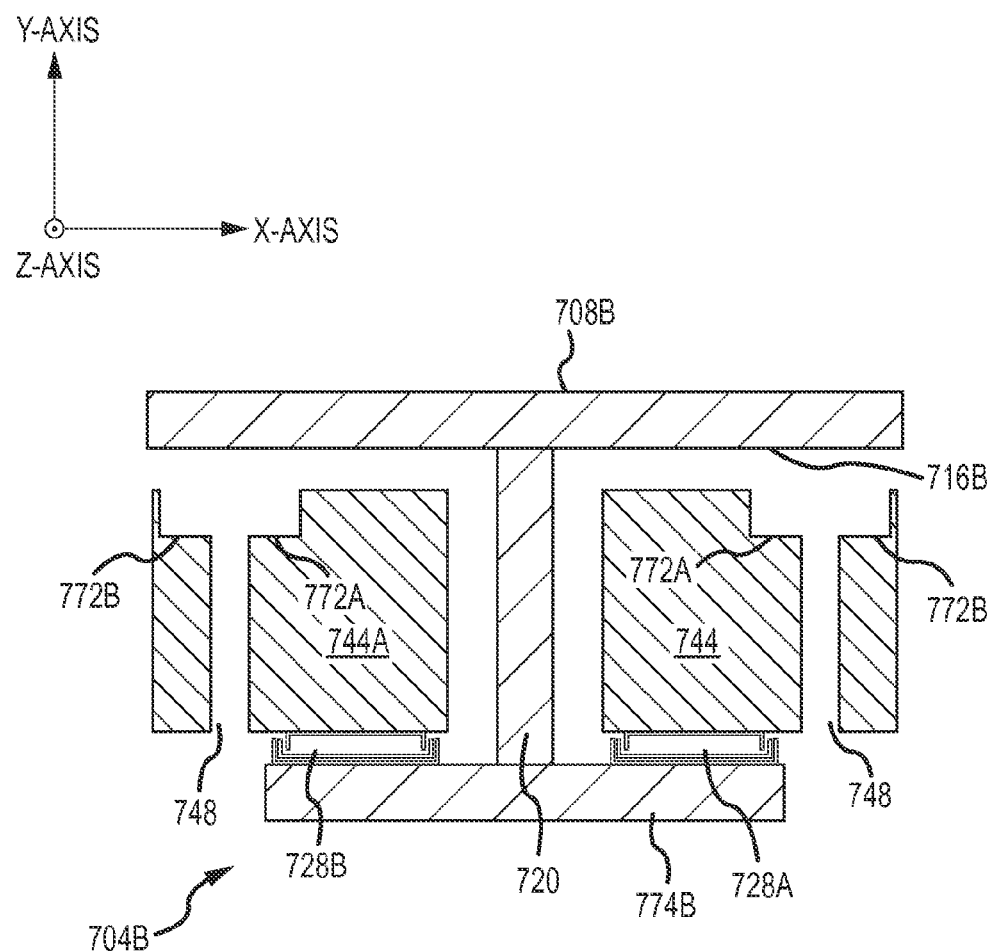
FIG. 7B is a cross-sectional front elevation view of a storage unit of still another embodiment of the present invention.

Although in FIG. 7A the horizontal support piece 774A is illustrated positioned proximate to the right side of the first support piece 720, it will be understood by those of skill in the art that the horizontal support piece 774A can be positioned adjacent on a left side of the first support piece 720. Additionally or alternatively, the horizontal support piece 774B can extend from both the left and right sides of the first support piece 720 in a storage device 704B as illustrated in FIG. 7B. A second sliding assembly 728B and a second center piece 744A are interconnected to the horizontal support piece 774B.

Storage devices 704A, 704B can include a top piece 708A, 708B with the first support piece 720 interconnected to a lower surface 716A, 716B of the top piece at a substantially right angle. Additionally or alternatively, the first support piece 720 can be interconnected directly to a mounting surface.

Additionally or alternatively, the storage devices 704A, 704B can include a front piece (not illustrated) the same as, or similar to, the front piece 164.

Figure 8A:
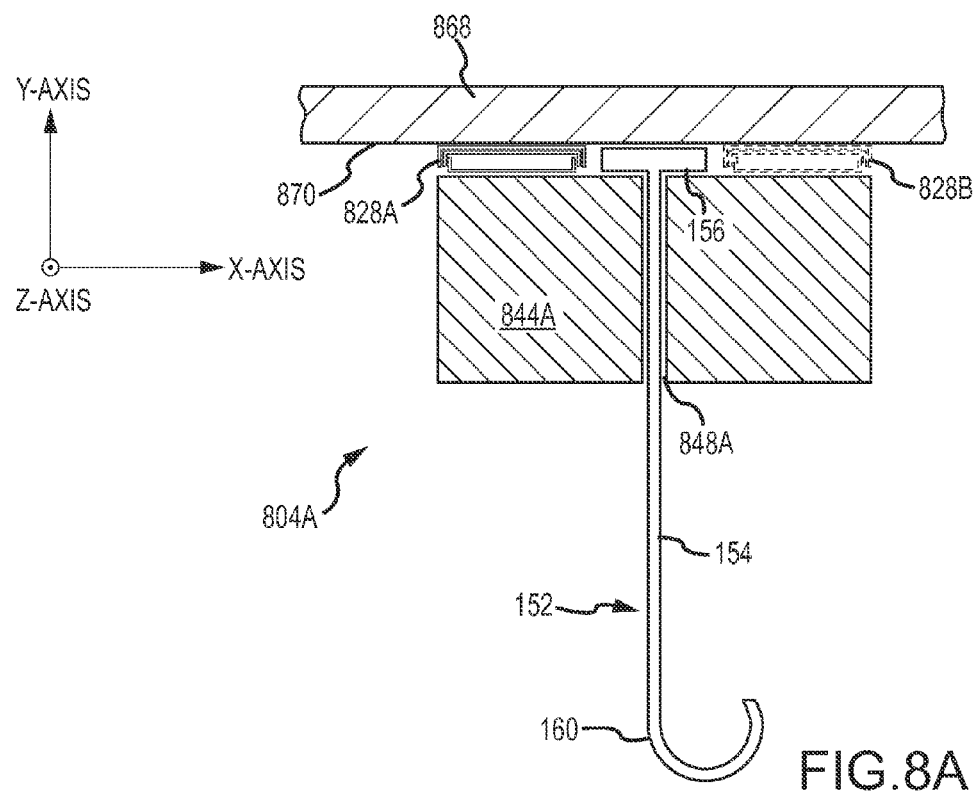
FIG. 8A is a cross-sectional front elevation view of a storage device according to yet another embodiment of the present invention.
Figure 8B:
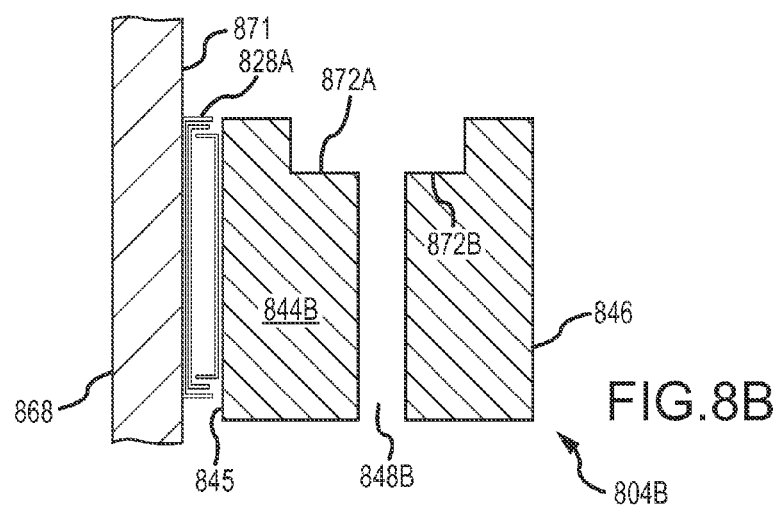
FIG. 8B is a cross-sectional front elevation view of another embodiment of a storage device according to the present invention.

Referring now to FIGS. 8A and 8B, cross-sectional front elevation views of embodiments of storage devices 804A and 804B are illustrated. The storage device 804A includes a sliding assembly 828A interconnected to a top surface of a center piece 844A. The sliding assembly 828A is interconnected to a lower surface 870 of a mounting surface 868. Optionally, a second sliding assembly 828B can be interconnected to the top surface of the center piece 844A and the lower surface 870. The center piece 844A has a length and width the same as or similar to the length 142 and width 143 of center piece 144.

The center piece 844A includes a slot 848A with a substantially uniform width without ledges. However, it will be appreciated that the slot 848A may be formed with ledges the same as or similar to ledges 172. The slot 848A has a width that is the same as the width 150A of lower portion 148A of slot 148. The length of slot 848A is the same as or similar to the length 147 of slot 148. A hook 152 is illustrated disposed in the slot 848A. The shank 154 is fixedly interconnected to the hook base 156 which rests on an upper surface of the center piece 844A. The lower end 160 of the hook 152 extends below the bottom surface of the center piece 844A.

Referring now to FIG. 8B, an embodiment of a storage device 804B adapted to be positioned in proximity to a vertical surface 871 of a mounting surface 868 is illustrated. The storage device 804B includes a center piece 844B interconnected to a sliding assembly 828A. The sliding assembly 828A is also interconnected to the vertical surface 871.

The center piece 844B has a length, width, and height the same as, or similar to, the length, width, and height of center piece 144. A slot 848B with ledges 872A, 872B, with dimensions and a shape similar to or the same as slot 148 and ledges 172A, 172B, is formed in the center piece 844B. The slot 848B extends from the top surface of the center piece 844B through the bottom surface of the center piece 844B. Although the storage device 804B is illustrated with the sliding assembly 828A interconnected to a left side 845 of the center piece 844B, is will be appreciated by one of skill in the art that the sliding assembly 828A may alternatively be interconnected to the right side 846 of the center piece 844B.

Additionally or alternatively, the storage devices 804A, 804B can include a front piece (not illustrated) the same as, or similar to, the front piece 164.

Figure 9A:
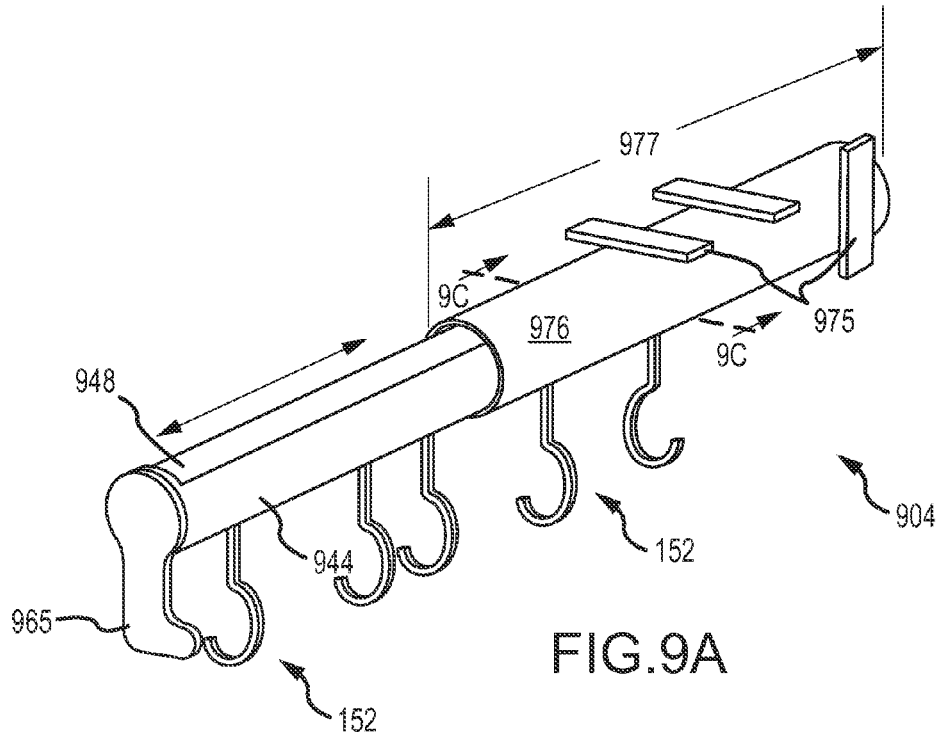
FIG. 9A is a perspective view of a storage device in a partially extended configuration according to another embodiment of the present invention.

Referring now to FIG. 9A, a perspective view of a storage device 904 in a partially extended configuration according to still another embodiment of the present invention is illustrated. The storage device 904 includes a body 976 that is hollow. The body 976 can be interconnected to a horizontal or vertical mounting surface. Optionally, the body 976 includes one or more horizontal or vertical mounting brackets 975 positioned at various locations on an exterior surface to facilitate interconnection to the mounting surface. Additionally or alternatively, one or more holes (not illustrated) may be positioned in an uppermost portion of the body 976 to facilitate interconnection of the body 976 to a mounting surface using fasteners, such as screws or the like.

The body 976 has a length 977 of between approximately 10 inches and approximately 30 inches. In one embodiment, the body 976 has a length 977 of between approximately 19 inches and approximately 25 inches. In a more preferred embodiment, the length 977 of the body 976 is between approximately 21 inches and approximately 23 inches. In a still more preferred embodiment, the length 977 is approximately 22 inches.

A center piece 944 is inserted within the hollow body 976 and is retained in a sliding relationship with the body 976. The body 976 and the center piece 944 have a generally cylindrical shape with a circular cross-section. In one embodiment, both the body 976 and the center piece 944 have a generally elliptical shape (not illustrated).

The center piece 944 has a length that is less than the length of the body 976. In one embodiment, the center piece 944 has a length of between approximately 6 inches and approximately 28 inches. In another embodiment, the length of the center piece 944 is between approximately 7.75 inches and approximately 23 inches. In a more preferred embodiment, the length of the center piece 944 is between approximately 18.5 inches and approximately 22 inches. The length of the center piece 944 is approximately 19.75 inches in a still more preferred embodiment.

Figure 9B:
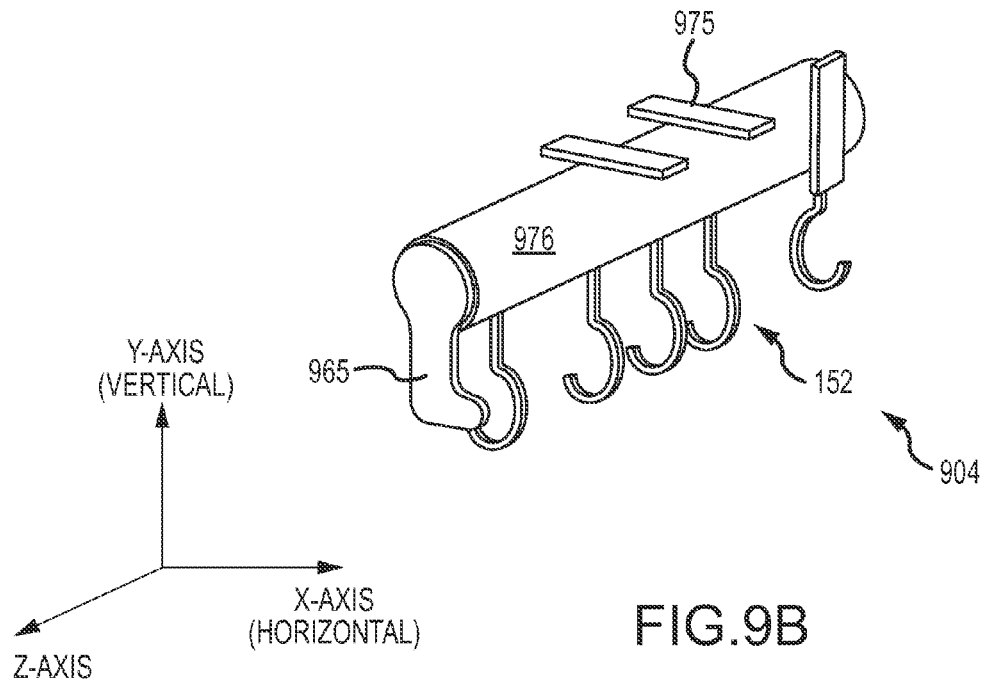
FIG. 9B is a perspective view of the storage device of FIG. 9A in a retracted configuration.

Additionally or alternatively, a pull or handle 965 is interconnected to the center piece 944. Optionally, the handle 965 can have a triangular, round, square, or rectangular shape or combinations thereof. In one embodiment, the handle 965 has a shape and dimensions similar to the front piece 164. The handle 965 is adapted to be gripped by a hand of a user to pull the center piece 944 to the extended configuration and push the center piece 944 into a retracted position, as illustrated in FIG. 9B.

Figure 9C:
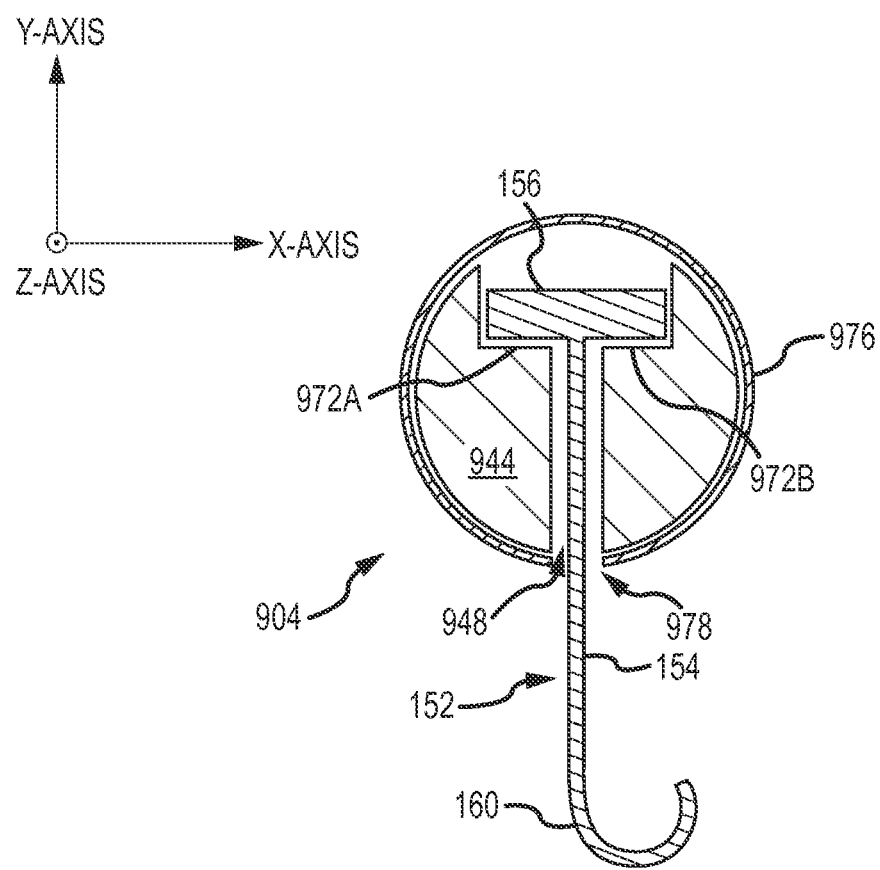
FIG. 9C is a cross-sectional elevation view of the storage device of FIG. 9A taken along line 9C.

Referring now to FIG. 9C, a slot 978 is formed in a lower portion of the cylindrical body 976. The slot 978 extends the length 977 of the cylindrical body 976. A generally vertical slot 948 is formed approximately through a diameter of the center piece 944 and a bottom opening of the slot 948 is positioned proximate slot 978 of the cylindrical body 976. The slot 948 includes ledges 972A, 972B and has a cross-section shape and dimensions the same as, or similar to, the slot 148 and ledges 172A, 172B. The slot 978 of the cylindrical body 976 is at least as wide as the slot 948 of the center piece 944. One or more hooks 152 are releasably positioned in the slot 948. The shank 154 is attached to the hook base 156 which rests on upper surfaces of the ledge 972A, 972B. The lower end 160 of the hook 152 extends through the slot 978 and below the bottom surface of the cylindrical body 976. Additionally or alternatively, one or more hooks may be slidably interconnected to the center piece 944.

Figure 10A:
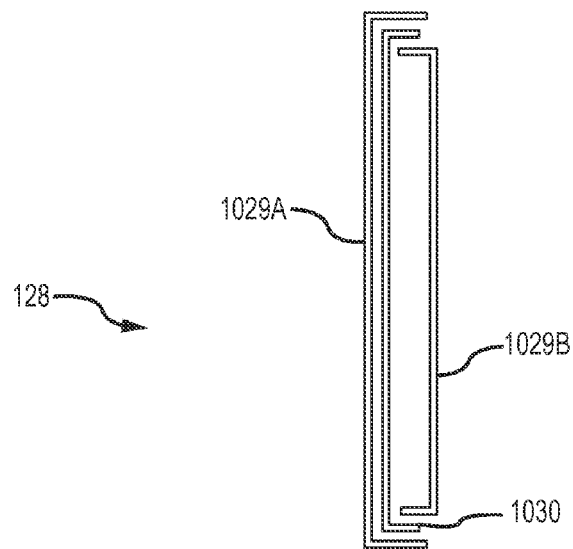
FIG. 10A is a cross-sectional view of one embodiment of a sliding assembly of the present invention.

Referring now to FIG. 10A, in some embodiments, the sliding assembly 128 may comprise a first fixed rail 1029A that is interconnected to a vertical or horizontal mounting surface 168, the first support piece 120, 620, the second support piece 132, 632, or the horizontal support piece 774. A second fixed rail 1029B slidingly engages the first fixed rail 1029A. The second fixed rail 1029B is interconnected to a top, bottom, left, or right surface of a center piece of the storage device of the present invention. A sliding assembly 128 comprised of a first fixed rail 1029A slidingly engaged with a second fixed rail 1029B can extend approximately three-fourths of the total length of first and second fixed rails 1029A, 1029B.

Additionally or alternatively, the sliding assembly 128 may include an optional sliding rail 1030 to enable the sliding assembly 128 to extend further. The sliding rail 1030 slidingly interconnects the first fixed rail 1029A with the second fixed rail 1029B. The sliding rail 1030 enables the sliding assembly to extend the full length of the first and second fixed rails 1029A, 1029B. When the center piece is interconnected to a sliding assembly 128 with an optional sliding rail 1030, the center piece is functional to fully extend from the cabinet or storage space, providing easy access to all of the hooks and items suspended therefrom. Thus, utilization of available storage space is improved by maximizing the number of items that can be stored therein. Efficiency is improved by providing better and quicker access to items of cookware. The sliding assembly has a width of about 0.5 inch. In one embodiment, the sliding assembly has a retracted length of between about 10 inches and about 28 inches. In another embodiment, the retracted length of the sliding assembly is between about 18 inches and about 22 inches. The retracted length of the sliding assembly is about 19.75 inches in a more preferred embodiment. The sliding assembly has an extended length of between about 20 inches and about 56 inches. The extended length of the sliding assembly is between about 36 inches and about 44 inches in another embodiment. In a more preferred embodiment, the extended length of the sliding assembly is about 39.5 inches.

Additionally or alternatively, the sliding assembly 128 may include drawer slides, including a drawer member and a cabinet member, and may include an intermediate member as well as a self-closing mechanism. The sliding assembly 128 may also include slides that reduce resistance in moving the sliding assembly 128, for example, through the use of rollers or ball bearings received in aligned tracks assembled with the sliding assembly 128. The ball bearings or rollers reduce friction forces experienced by the sliding assembly 128. Optionally, the sliding assembly 128 can include a linear arrangement of many ball bearings or rollers to provide support and reduce friction between the fixed rails 1029 and the sliding rail 1030.

Additionally or alternatively, the sliding assembly 128 may comprise an under-mount drawer slide, adapted to be placed under a drawer or the like. Use of a sliding assembly 128 mounted under the center piece generally hides the sliding assembly underneath the center piece when the center piece is extended.

Optionally, sliding assemblies 128 may be obtained commercially from various suppliers. For example, suitable sliding assemblies 128 may comprise full extension ball bearing drawer slides similar to, for example, GLIDERITE™ drawer slides.

Figure 10B:
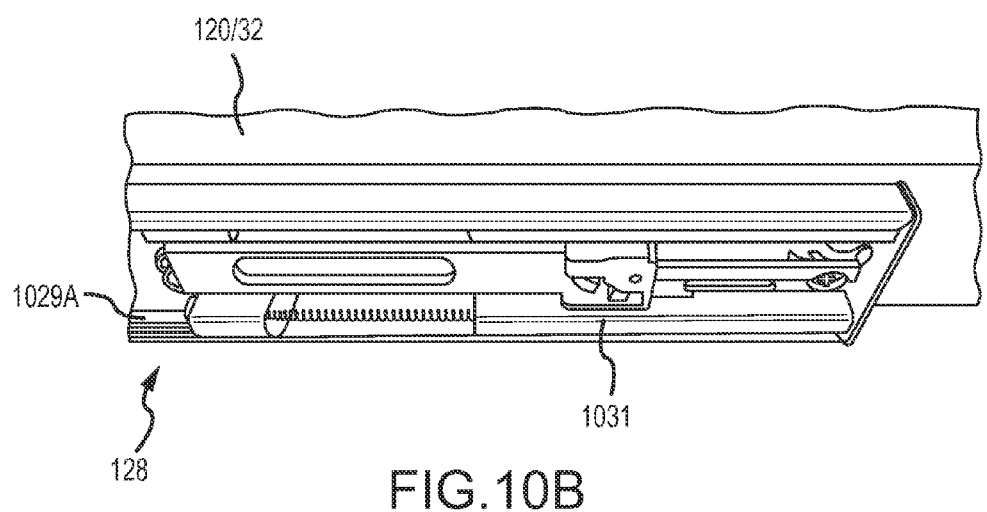
FIG. 10B is a perspective view of the sliding assembly of FIG. 10A with a soft close mechanism.

Referring now to FIG. 10B, the sliding assembly 128 may also include a soft-close mechanism 1031. The soft-close mechanism 1031 may slow the center piece as the storage device is moved to the retracted position and prevent the cookware suspended from the storage device from bumping or banging together. As illustrated in FIG. 10B, the sliding assembly 128 is interconnected to an interior surface of a first support piece 120 and/or a second support piece 132. The soft-close mechanism 1031 is interconnected to the first fixed rail 1029A. Suitable soft-close mechanisms are commercially available any may be obtained from various suppliers. One commercially available soft-close mechanism is the PRO200™ full extension soft-close ball bearing drawer slide, available from Wurth.

Figure 11A:
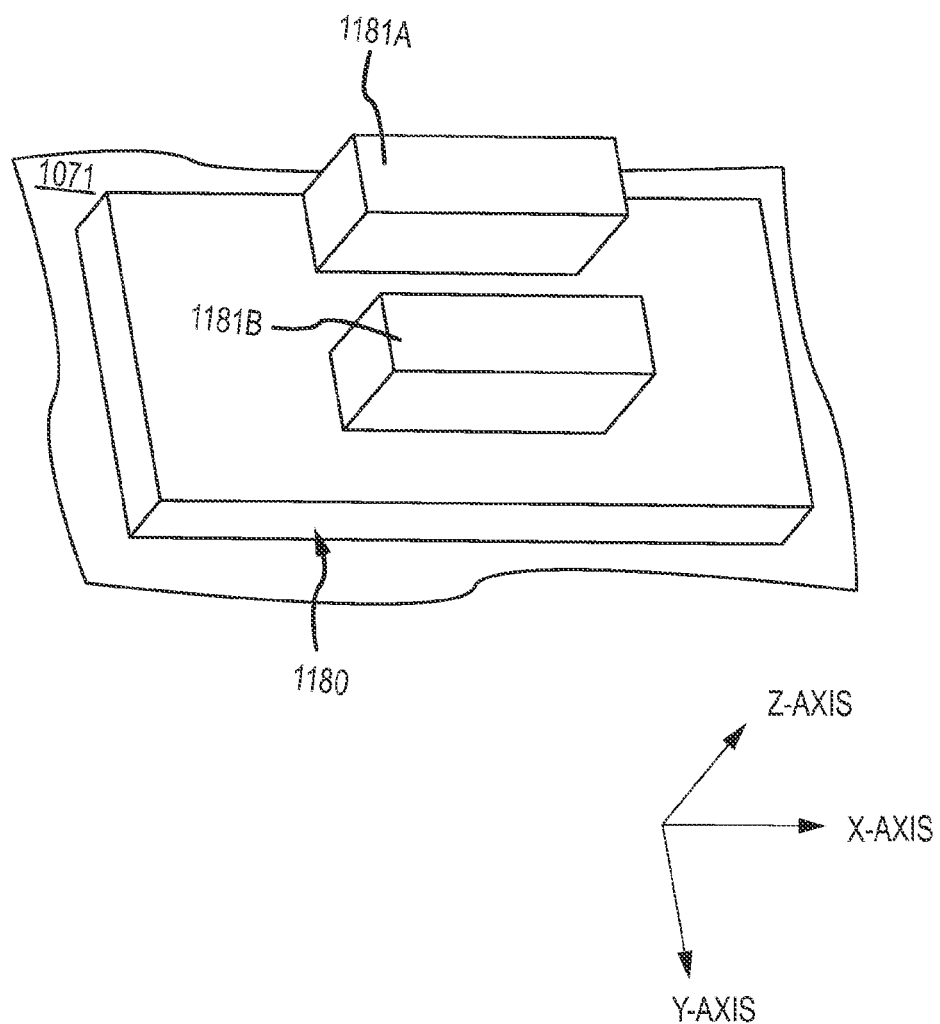
FIG. 11A is a perspective view of a mounting bracket of an embodiment of the present invention interconnected to a vertical surface.

Referring now to FIG. 11A, a mounting bracket 1180 of the present invention is illustrated. The mounting bracket 1180 can be mounted, attached, or fixed to a vertical surface 1071 of any structure, including a vertical surface in an interior of a storage cabinet or a closet, and is adapted to support a back portion of the storage device of the present invention. The mounting bracket 1180 has a body portion with a height parallel to the Y-axis of about 1 inch to about 6 inches. In a preferred embodiment, the height of the body portion of the mounting bracket 1180 is about 2.5 inches to about 3.5 inches. In a more preferred embodiment, the height of the body portion is about 3 inches. The body portion of the mounting bracket 1180 has a width parallel to the X-axis of about 4 inches to about 8.5 inches. In a preferred embodiment, the width of the body portion of the mounting bracket 1180 is about 5.5 inches to about 7 inches. In a still more preferred embodiment, the width of body portion of the mounting bracket 1180 is about 6.25 inches. The body of the mounting bracket 1180 has a thickness parallel to the Z-axis of about 0.25 inch to about 1.25 inches. In a more preferred embodiment, the thickness of the body portion of the mounting bracket 1180 is about 0.75 inch.

Two horizontal support pieces 1181 are fixed to a front surface of the body portion of the mounting bracket 1180 and generally project perpendicularly from the body portion parallel to the Z-axis. A upper horizontal support piece 1181A is positioned above a lower horizontal support piece 1181B. The upper and lower horizontal support pieces 1181A, 1181B are generally parallel to each other and to the X-axis.

In one embodiment, the horizontal support pieces 1181A, 1181B have a length parallel to the Z-axis of about 1 inch to about 1.5 inches. In a more preferred embodiment, the length of the horizontal support pieces 1181A, 1181B is about 1.25 inches. In one embodiment, the horizontal support pieces 1181A, 1181B have a width parallel to the X-axis of about 2 inches to about 3 inches. In a more preferred embodiment, the width of the horizontal support pieces 1181A, 1181B is about 2.5 inches. In one embodiment, a distance between the upper horizontal support piece 1181A and the lower horizontal support piece 1181B is about 0.5 inch to about 1 inch. In a more preferred embodiment, the distance between the upper and lower horizontal support pieces 1181A, 1181B is approximately 0.75 inches.

Figure 11B:
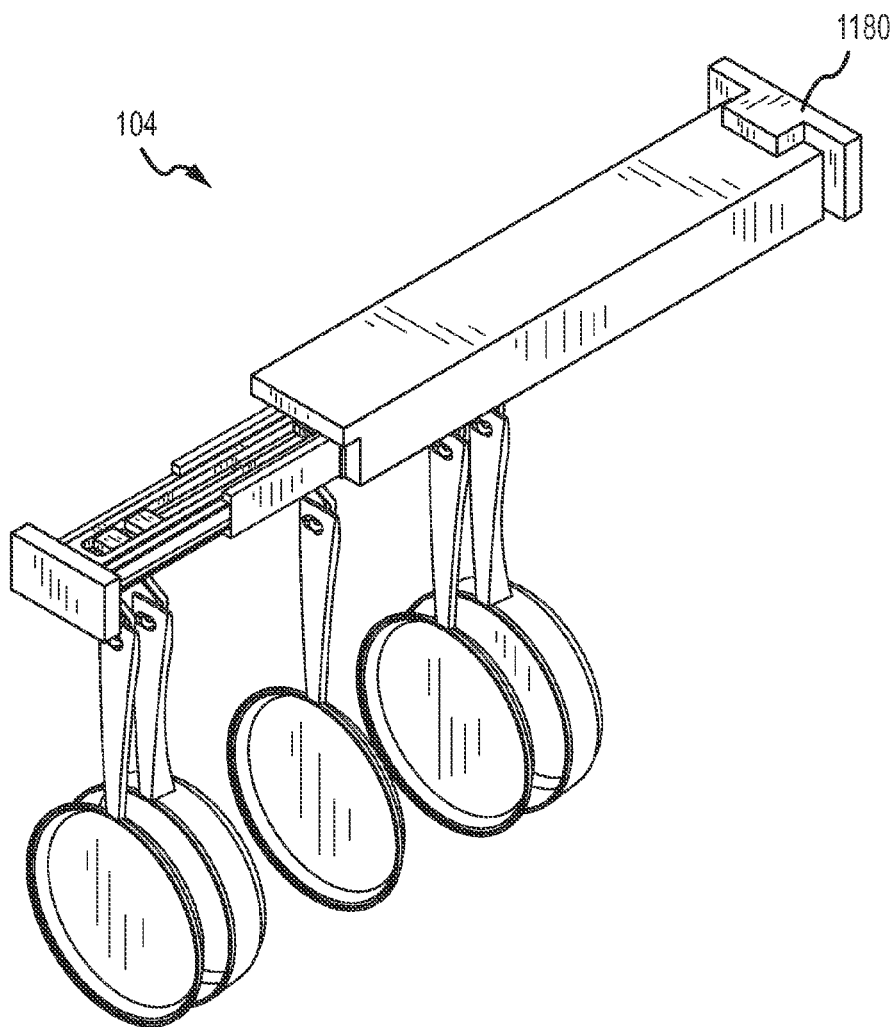
FIG. 11B is a perspective view of the storage device of FIG. 1 interconnected to the mounting bracket of FIG. 11A.

In operation, the mounting bracket 1180 is attached to a desired vertical surface. As illustrated in FIG. 11B, a rear portion of the top piece 108 is positioned between the upper and lower horizontal support pieces 1181A, 1181B. The top piece 108 is supported by the lower horizontal support piece 1181B and the lower horizontal support piece 1181B is positioned between the first and second support pieces 120, 132.

Figure 12:
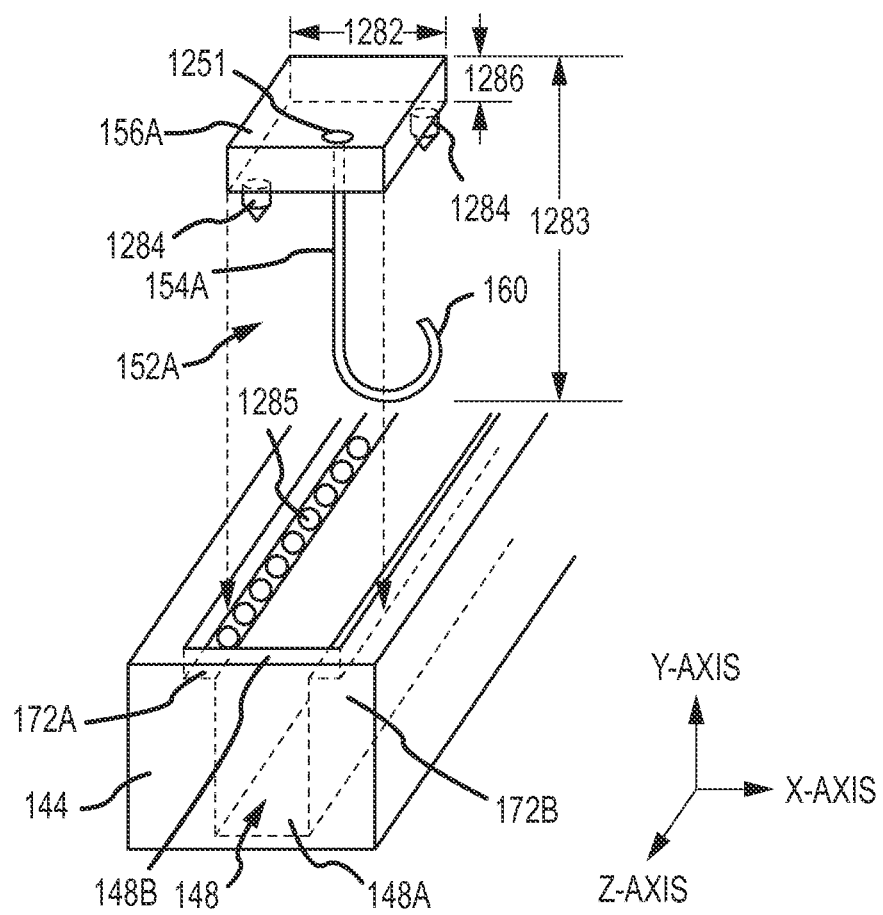
FIG. 12 is a perspective view of a hook and a center piece according to embodiments of the present invention.
Figure 12A:
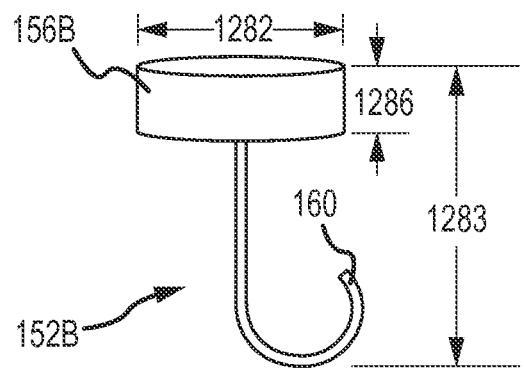
FIGS. 12A-12D are perspective views of hooks according to embodiments of the present invention.

Referring now to FIG. 12, a perspective view of a hook 152A and a center piece 144 according to embodiments of the present invention are illustrated. The hook 152A includes a shank 154A that extends through a bore of the hook base 156A and the shank 154A can swivel or rotate relative to the hook base 156A about the Y-axis. Additionally or alternatively, a hook 152 can have a shank 154A that is fixedly attached to the hook base 156, as illustrated in FIG. 12A. The hook base 156A has a width 1282 that is sufficiently equal to the width 150B of the upper portion 148B of the slot 148 to prevent the hook base 156A, and thus the hook 152A, from rotating within the slot 148. Additionally or alternatively, the width 1282 of the hook base 156A may be sufficiently less than the width 150B of the upper portion 148B of the slot 148 to allow the hook base 156A to rotate within the upper portion 148B of the slot 148.

Figure 12B:
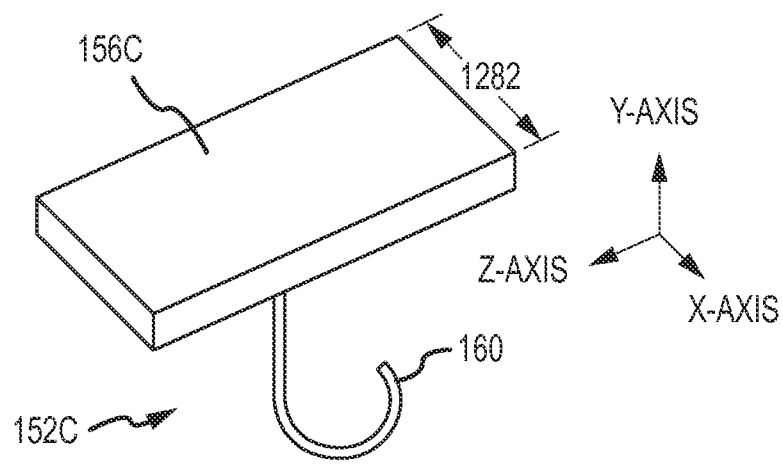
Figure 12C:
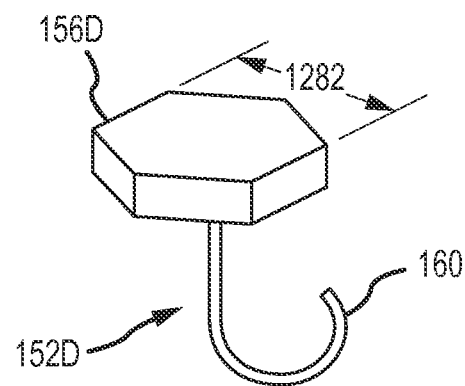
Figure 12D:
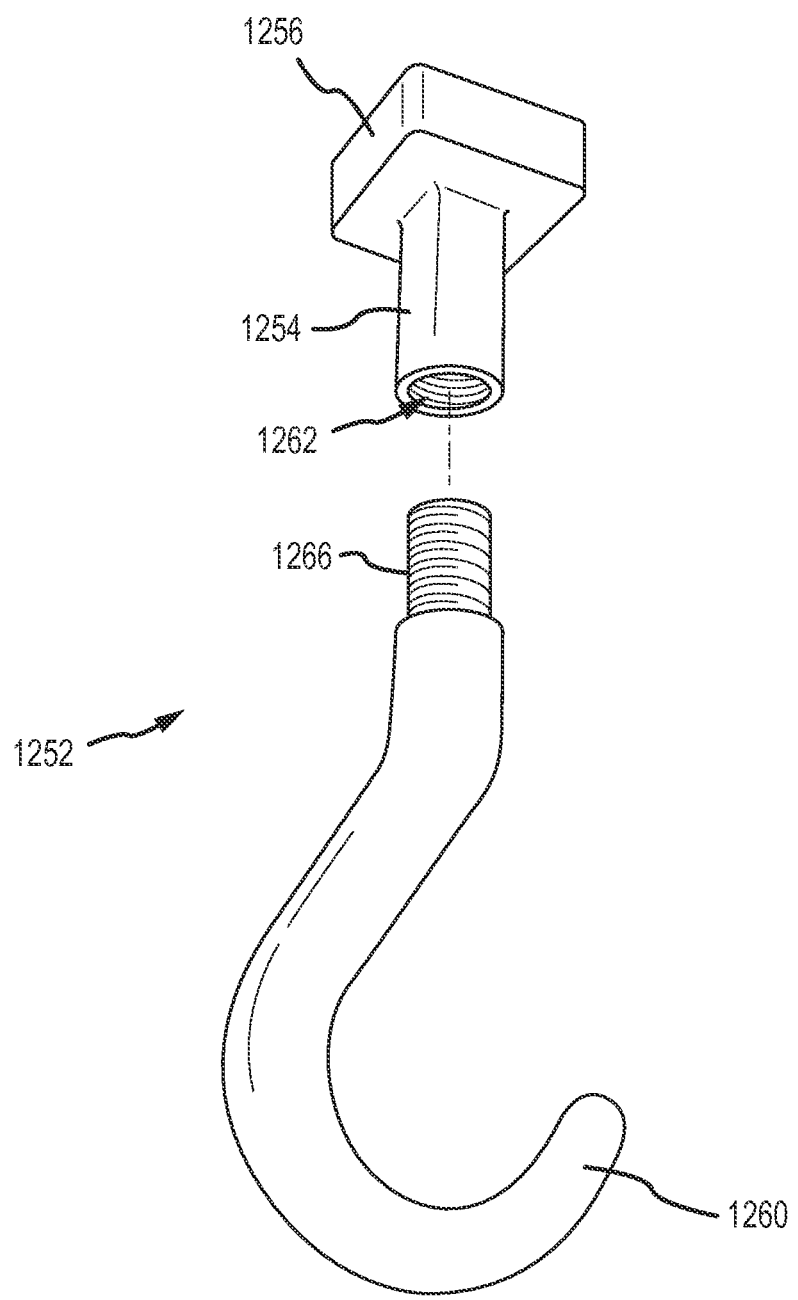
Figure 13A:
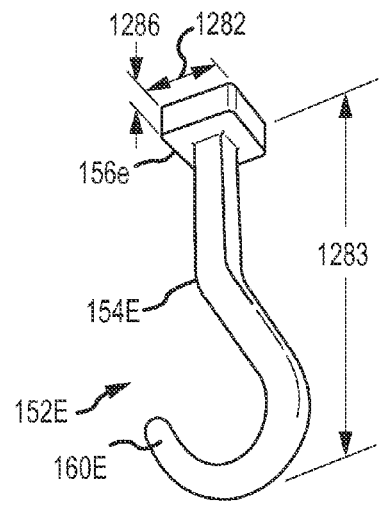
FIG. 13A is a perspective view of a hook of one embodiment of the present invention.
Figure 13B:
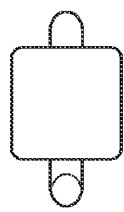
FIG. 13B is a top plan view of the hook of FIG. 13A.
Figure 13C:
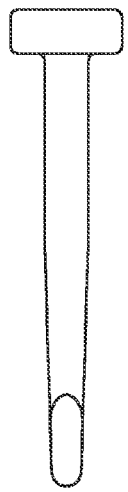
FIG. 13C is a front elevation view of the hook of FIG. 13A.
Figure 13D:
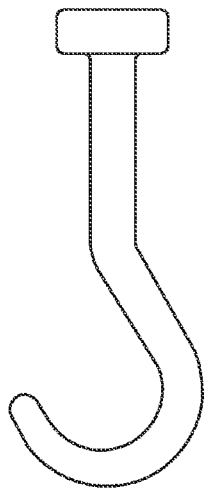
FIG. 13D is a side elevation view of the hook of FIG. 13A.
Figure 13E:
FIG. 13E is a rear elevation view of the hook of FIG. 13A.
Figure 13F:
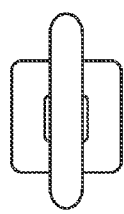
FIG. 13F is a bottom plan view of the hook of FIG. 13A.
Figure 14B:
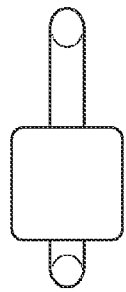
FIG. 14B is a top plan view of the double hook of FIG. 14A.
Figure 14A:
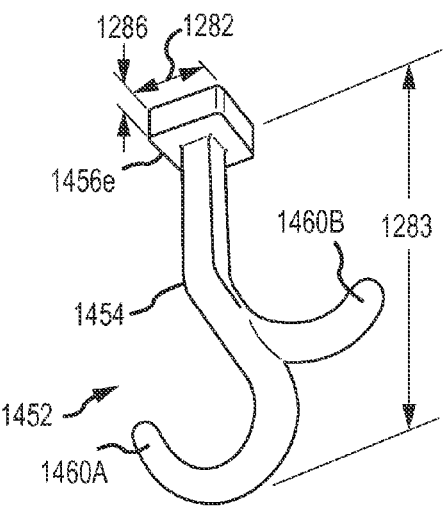
FIG. 14A is a perspective view of a double hook of one embodiment of the present invention.
Figure 14C:
FIG. 14C is a front elevation view of the double hook of FIG. 14A.
Figure 14D:
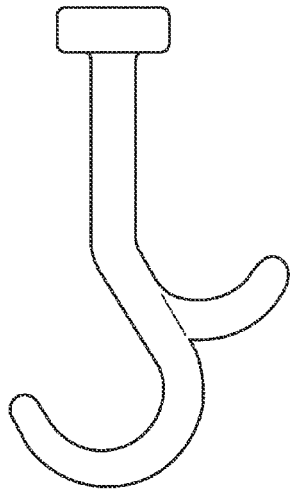
FIG. 14D is a side elevation view of the double hook of FIG. 14A.
Figure 14E:
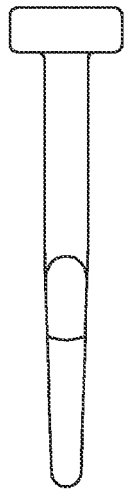
FIG. 14E is a rear elevation view of the double hook of FIG. 14A.
Figure 14F:
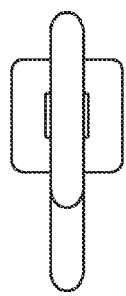
FIG. 14F is a bottom plan view of the double hook of FIG. 14A.
Figure 15A:
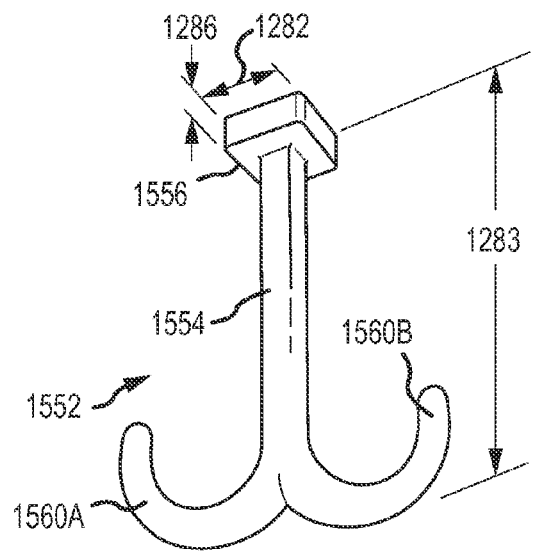
FIG. 15A is a perspective view of a back to back hook of one embodiment of the present invention.
Figure 15B:
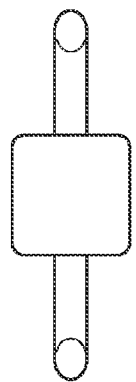
FIG. 15B is a top plan view of the back to back hook of FIG. 15A.
Figure 15C:
FIG. 15C is a front elevation view of the back to back hook of FIG. 15A.
Figure 15D:
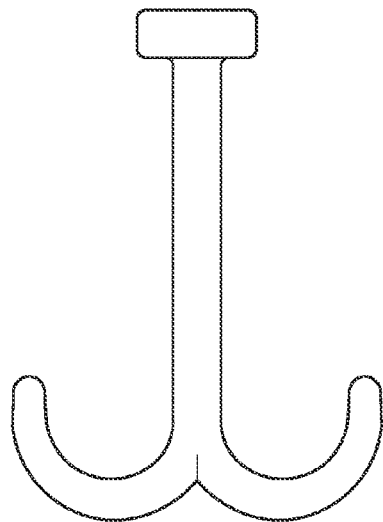
FIG. 15D is a side elevation view of the back to back hook of FIG. 15A.
Figure 15E:
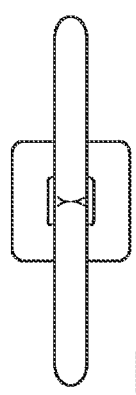
FIG. 15E is a bottom plan view of the back to back hook of FIG. 15A.

Optionally, the hook 152 may be configured as a single unit, wherein the hook base 156, the shank 154 and the lower end 160 are all manufactured from the same piece of material. The hook 152 can be made of any suitable material known to those of skill in the art such as wood, plastic, metal, and/or combinations thereof. Additionally or alternatively, the hook 152 may be configured from a separate shank 154 and lower end 160 that are mechanically attached to the hook base 156. In one embodiment, an upper portion of the shank 154 is threaded and threadably engages a threaded bore in the lower surface of the hook base 156. In another embodiment, the upper portion of the shank 154 is inserted in a vertical bore through the hook base 156 and attached to the hook base by a fastener or hook attachment 1251. The hook attachment 1251 may be selected from the group consisting of a pin, a screw, a nail, a weld, a monolith, and any other suitable fastening means. The shank 154 may also be connected to the lower surface of the hook base by a weld, a pin, or by any other suitable means known to those of skill in the art. In one embodiment, illustrated in FIG. 12D, a hook 1252 includes a shank 1254 connected to a lower surface of a hook base 1256. The shank 1254 has a threaded bore 1262 at a lower end opposite the hook base 1256. A lower end 1260 has a threaded extension 1266 adapted to threadably engage the threaded bore 1262 to interconnect the lower end 1260 to the shank 1254.

In all embodiments described herein, when the center pieces are at least partially extended, the user has easy, unrestricted access to the slot 148, allowing the addition or removal of hooks 152 of different shapes, sizes, and for different items as desired, without requiring the disassembly of the storage device 104 or removal of the storage device from a mounting surface 168 to which it is attached. The hooks 152 may also be repositioned along the length of the center piece 144 and may also be rotated about the Y-axis to change the orientation of the lower end 160 extending below the center piece 144. These features allow the user to customize the position of the hooks 152 to thereby efficiently position the articles hanging from the hooks 152 within the storage space. The hooks 152 can also be easily removed for cleaning.

Additionally or alternatively, one or more protrusions 1284, such as bumps, ridges, spheres, pins, pyramids, and the like, can be formed on a lower surface of the hook base 156. Multiple recesses 1285 having a corresponding shape are formed on the ledges 172A, 172B. In operation, the protrusions 1284 of the hooks 152 align with the recesses 1285 and reduce or prevent inadvertent or unintended movement of the hook 152 within the slot 148. Optionally, the protrusions can be formed on the ledges 172A, 172B and the corresponding recesses formed in the lower surface of the hook base 156.

Additionally or alternatively, the hook base 156 can include a magnet or be made of a magnetized material. A strip of magnetic material, or individual pieces of magnetic material, can be positioned on the ledges 172A, 172B or the sides of the slot 148 above the ledges 172A, 172B to align with the magnet of the hook base 156. In operation, the attraction between the magnet and the magnetic material in the slot will prevent or reduce inadvertent or unintended movement of a hook 154 within the slot 148. Optionally, the magnets can be positioned on the ledges 172A, 172B or the sides of the slot and the hook base 156 can be made of a magnetic material. Further, a hook and loop material may be applied to bottom surface of the hook base 156 and the ledges 172A, 172B to retain the hooks 152 in a predetermined position.

The hook base 156A illustrated in FIG. 12, has a generally square shape. However, as will be appreciated by one of skill in the art, a hook 152 can have a hook base 156 with a general profile of a square, a rectangle, a circle, an oval, a polygon, a pentagon, a hexagon, and/or combinations thereof or of any other suitable shape.

In one embodiment, illustrated in FIG. 12A, a hook 152B has a round hook base 156B. The hook base 156B may have a diameter or width 1282 about equal to the width of the upper portion 148B of the slot, such that the hook base 156B may rotate within the upper portion of the slot 148 about the Y-axis. In another embodiment, illustrated in FIG. 12B, a hook 152C has a rectangular hook base 152C. The length can be 1 inch, 2 inches, 3 inches, 4 inches or any other desired length and can be used to provide separation between one or more hooks. For example, if two hooks have a hook base 152C with a length of 4 inches, and the shanks of the hooks are substantially centered on the base, the two hooks would be separated by 4 inches when placed in the slot 148. In still another embodiment, a hook 152D has a hook base 156D with a hexagonal shape which enables the lower end 160D of the hook 152D to be positioned in multiple alignments.

The hook base 156 may be manufactured from wood, plastic, metal or combinations thereof. In a preferred embodiment, the hook base 156 may be manufactured from metal.

Hook bases 156, 156A, 156B, 156C, and 156D are sized to fit at least partially into the slot 148 and rest on the top surface of the center piece or of the ledges 172A, 172B. In one embodiment, the hook base has a width 1282 of between approximately 0.445 inch and approximately 1.445 inches. In another embodiment, the width 1282 of the hook base is between approximately 0.645 inch and approximately 1.245 inch. In a more preferred embodiment, the width 1282 of the hook base is approximately 0.945 inch. In some embodiments the width 1282 of the hook base 156 is greater than the width 150A, 150B of the slot 148 such that the hook base 156 rests on the top surface of the center piece 144 as illustrated in FIG. 8A. The hook bases have a thickness 1286 between about 0.25 inch and about 0.5 inch. The thickness 1286 of the hook bases is about 0.380 inch in a more preferred embodiment. Additionally or alternatively, the corners and the edges of the hook base can be rounded. In one embodiment, each of the horizontal edges of the hook base 156 are rounded and have a radius of approximately 0.05 inch. In another embodiment, each of the vertical edges of the hook base 156 are rounded and have a radius of approximately 0.1 inch. In one embodiment, a horizontal cross section of the shank 154 of the hook 152 has a generally square shape with sides having a length of between approximately 0.35 inch and approximately 0.41 inch. In a more preferred embodiment, the length of the sides of the shank 154 is approximately 0.38 inch.

The hooks 152 described herein may be used with center pieces of all embodiments of this disclosure. The hooks are adapted to have a sufficient length 2183 so that the lower end 160 extends below the bottom surface of the center pieces. In one embodiment, the length 2183 of the hooks is between about 2 inches and about 8 inches. In a more preferred embodiment, the length 2183 is between about 2.75 inches and about 3.25 inches. In a still more preferred embodiment, the length 2183 is about 3 inches. In another preferred embodiment, the length 2183 is between about 3.5 inches and 6 inches. In a still more preferred embodiment, the length 2183 is approximately 4.06 inches.

The hooks 152 include a lower end 160 adapted to releasably hold any desired item in a hanging relationship. As used herein, the term lower end refers to a lower portion of the hook 152 adapted to releasably retain an item of any type. The lower end 160 may be curved and have a J-shape. Additionally or alternatively, the lower end 160 may comprise at least two straight sections connected at an angle. For example, the lower end 160 can be substantially L-shaped or V-shaped to facilitate hanging various articles from the hook 152. In some embodiments, the lower end 160 may include a cord, cable, flexible material, a biased clip (such as a clothes pin or the like), a flexible loop, a noose, a spring-loaded clasp, or other suitable interface means.

A hook 152E of the present invention is illustrated in FIGS. 13A-13F. The hook 152E has a length 1283 as described above. Additionally, the hook 152E includes a shank 154E, a lower end 160E, and a hook base 156E with a width 1282 and a thickness 1286 the same or similar to the dimensions described in FIG. 12. The shank 154E is fixedly attached to the hook base 156E.

Referring now to FIGS. 14A-14F, a double hook 1452 of the present invention is illustrated. The double hook 1452 has a length 1283 and includes a shank 1454 and a hook base 1456 that may be of any shape and width 1282 and thickness 1286 as described in conjunction with FIG. 12. The hook includes a first lower end 1460A and a second lower end 1460B that is positioned on an opposite side of the shank 1454. The second lower end 1460B is positioned on the shank 1454 closer to the hook base 1456 than the first lower end 1460A.

A back-to-back hook 1552 of the present invention is illustrated in FIGS. 15A-15E. The hook 1552 includes a shank 1554 and a first lower end 1560A. A second lower end 1560B of substantially the same size and shape as the first lower end 1560A is positioned on an opposite side of the shank 1554. The first and second lower ends 1560A, 1560B are positioned substantially the same distance from the hook base 1556. The hook 1552 has a length 1283 and hook base width 1282 and thickness 1286 as described above in conjunction with FIG. 12.

Figure 16:
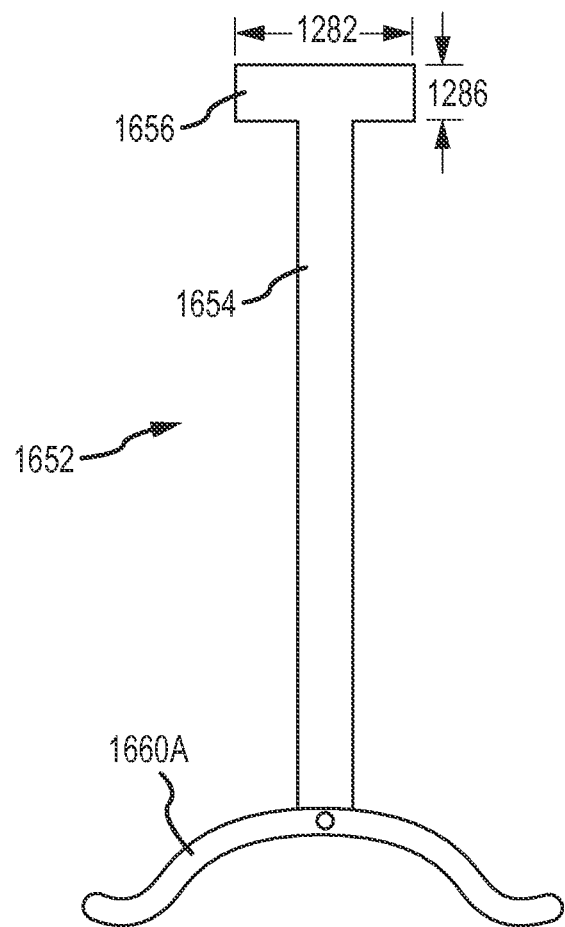
FIG. 16 is an elevation view of a hook of the present invention adapted to hold a strapped item.

Referring now to FIG. 16, a hook 1652 adapted to hold strapped items, such as purses, backpacks, tools, and the like is illustrated. The hook 1652 includes a shank 1654 and a hook base 1656. The hook base 1656 can be of a width 1282 and a thickness 1286 and of any shape as previously described in conjunction with FIG. 12. A double-sided lower end 1660A is pivotally attached to the shank 1654. The lower end 1660A is adapted to hold straps of items while preventing a point load that can damage the strapped item. The terminal ends of the lower end 1660A may optionally bend upward to prevent the strap from sliding off of the lower end 1660A.

Figure 17:
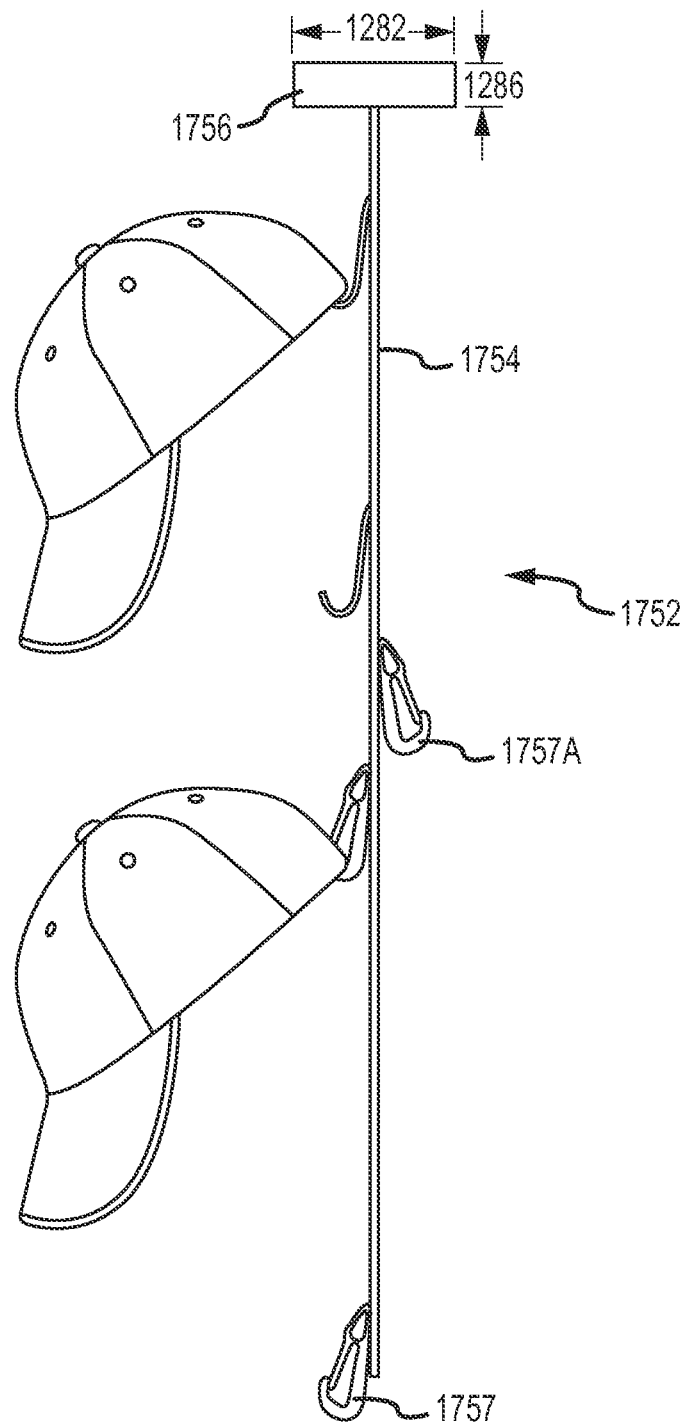
FIG. 17 is an elevation view of a hat hook according to one embodiment of the present invention.

A hat hook 1752 according to one embodiment of the present invention is illustrated in FIG. 17. The hat hook 1752 includes a hook base 1756 and a shank 1754. The shank 1754 may be formed of a flexible or bendable material or strapping. One or more hooks 1757 are fixed to the shank 1754. Optionally, the hooks 1757 can be snaps or clips 1757A. The hooks 1757 can be positioned on one or more sides of the shank 1754. Additionally or alternatively, the hooks 1757 may be slidingly attached to the shank 1754 to enable vertical repositioning of the hooks 1757 and the addition or removal of hooks to the shank 1754.

Figure 18A:
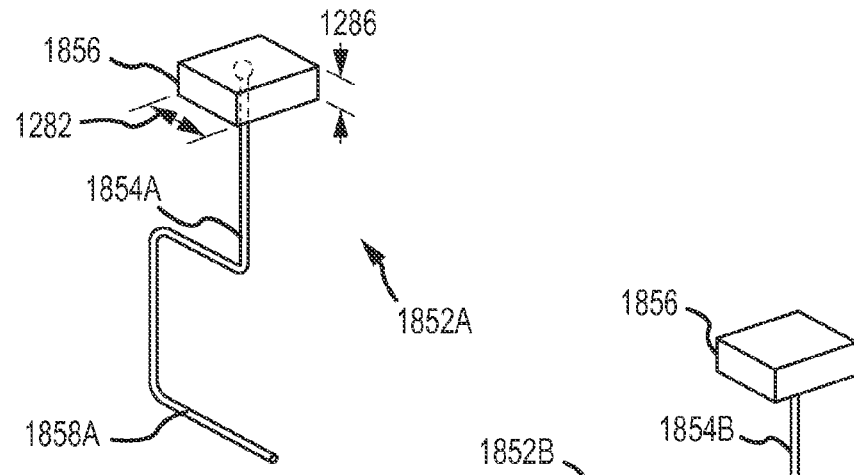
FIGS. 18A and 18B are perspective views of tie hooks according to embodiments of the present invention.
Figure 18B:
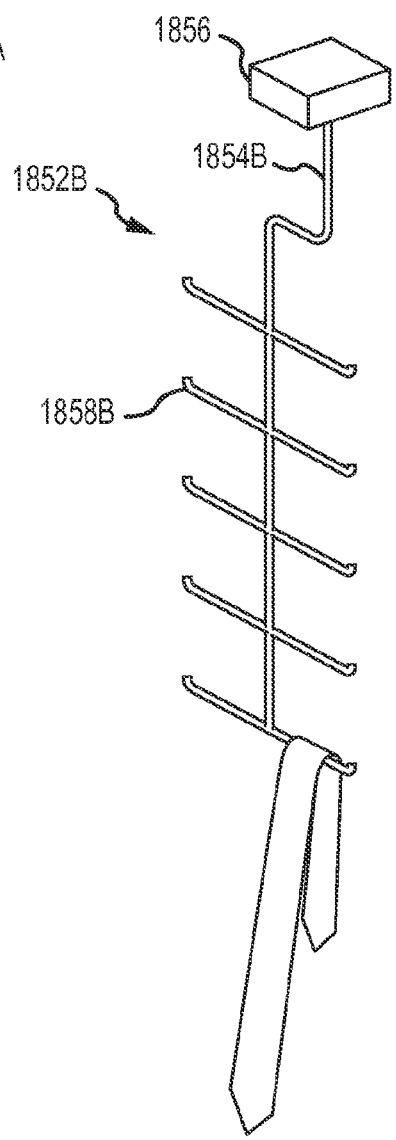

Referring now to FIGS. 18A and 18B, tie hooks 1852 of the present invention are illustrated. The tie hooks 1852 have a hook base 1856 with a width 1282, thickness 1286, and shape that are the same as or similar to the hook bases 156 described in conjunction with FIG. 12. The shank 1854 can be fixedly attached to the hook base 1856 or can extend through a bore of the hook base 1856 thereby enabling the shank 1854 to rotate about the Y-axis with respect to the hook base. One or more holders 1858 are connected to the shank 1854. The holders 1858 are generally horizontal and have a length of less than about 2 inches. In one embodiment, the holders 1858A are substantially straight. In another embodiment, the holders 1858B have an upturned distal end. The holders 1858 can be connected to one side of the shank 1854 or on both sides of the shank 1854. The holders 1858 are not limited to supporting ties and can support any number of items, including belts, scarves, clothes, and the like.

Hooks 1952A, 1952B of the present invention adapted for hanging clothes are illustrated in FIGS. 19A-19D. The hooks 1952A, 1952B have two square hook bases 1956 with a shank 1954 fixedly attached to a lower surface of each hook base 1956. A generally horizontal holder 1958 is fixedly attached to each of the shanks 1954. Optionally, protrusions 1959 are formed at intervals on an upper surface of the horizontal holder 1958A to align clothes hangers and prevent unintended or inadvertent movement of the clothes hangers. The protrusions 1959 may have a profile that is round, square, triangular, or combinations thereof.

Figure 19A:
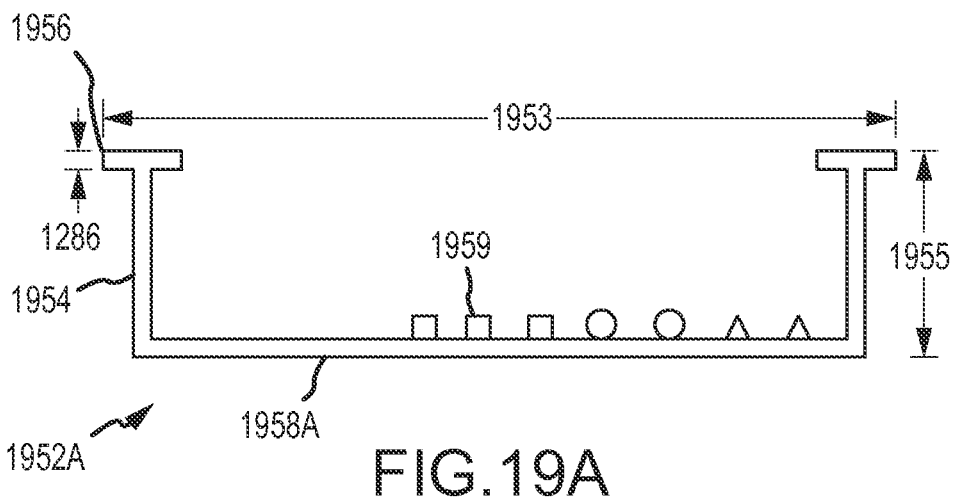
FIG. 19A is a side elevation view of a hook adapted for hanging clothes according to one embodiment of the present invention.
Figure 19B:
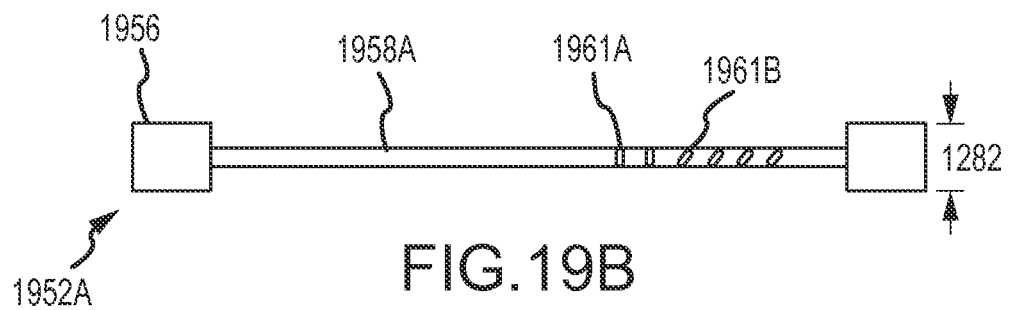
FIG. 19B is a top plan view of the hook of FIG. 19A.

In some embodiments, one or more grooves 1961A, 1961B are formed on an upper surface of the holder 1958A, illustrated in FIG. 19B, to prevent unintended or inadvertent movement of clothes hangers positioned on the holder 1958A. The grooves 1961A, 1961B have a width adapted to receive a clothes hanger and can be formed at various angles transverse to the length of the holder 1958A to keep the hangers in position. In one embodiment, the grooves 1961A are substantially perpendicular to the length of the holder 1958A. In another embodiment, the grooves 1961B are formed at an angle of approximately 45 degrees to the length of the holder 1958A.

The hooks 1952A, 1952B have a length 1953 of between about 10 inches and about 30 inches. In a more preferred embodiment, the length 1953 is between about 15 inches and about 20 inches. In a still more preferred embodiment, the length 1953 is about 17.5 inches.

The hooks 1952A, 1952B have a height 1955 between about 2 inches and about 7 inches. In a more preferred embodiment, the height 1955 is between about 2.5 inches and about 4 inches. In a still more preferred embodiment, the height 1955 is about 3.25 inches.

Figure 19C:
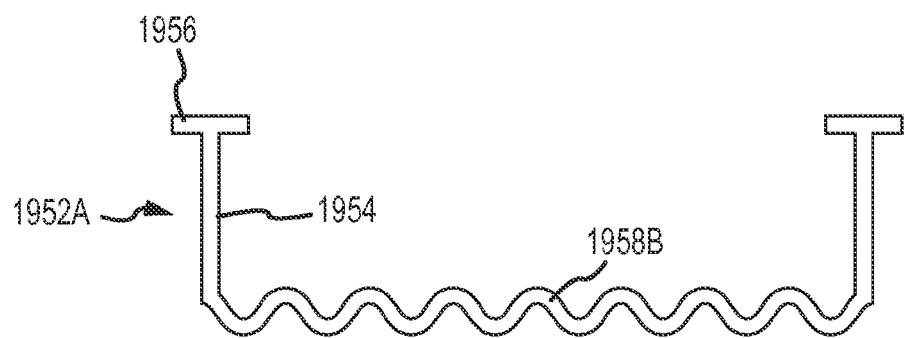
FIG. 19C is a side elevation view of another embodiment of a hook adapted for hanging clothes of the present invention.

Referring now to FIG. 19C, a hook 1952B can optionally have a holder 1958B that is adapted to prevent or reduce unintentional or inadvertent movement of clothes hangers supported by the holder 1958B. The holder 1958B may have a textured or wavy upper surface.

Figure 19D:
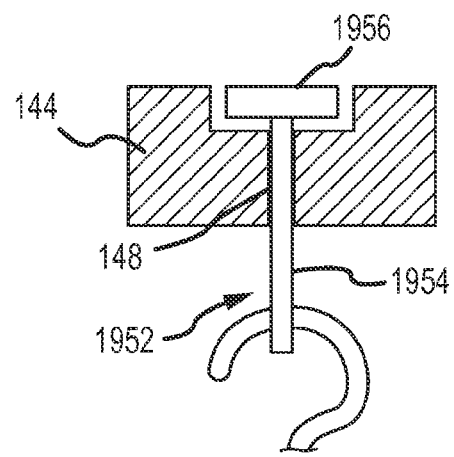
FIG. 19D is a cross-sectional front elevation view of a hook adapted for hanging clothes positioned in a slot of a center piece of a storage device of the present invention.

In operation, the holder 1958 of the hook 1952 extends beneath a center piece 144 as illustrated in FIG. 19D. The hook base 1956 is supported in the slot 148 as described above.

Although various dimensions are provided to illustrate exemplary embodiments of hooks, storage devices and the components thereof, and it is expressly contemplated that dimensions may be modified in storage devices and hooks of the present invention and still comport with the scope and spirit of the present disclosure.

The disclosure has been described with reference to various specific embodiments and techniques. However, it should be understood that many variations and modifications may be made while remaining within the spirit and scope of the invention.

It is appreciated that certain features of the invention, which are, for clarity, described in the context of separate embodiments, may also be provided in combination in a single embodiment. Conversely, various features of the invention that are, for brevity, described in the context of a single embodiment, may also be provided separately or in any sub-combination.

What is claimed is:

1. A storage device adapted to be attached to a mounting surface, the storage device comprising:
   a first support piece;
   a second support piece aligned substantially parallel to the first support piece;
   a center piece positioned between the first and second support pieces, the center piece comprising:
      a length
      a top surface opposite a bottom surface;
      a first side surface;
      a second side surface opposite the first side surface; and
      a slot formed in the center piece and extending from the top surface of the center piece through the bottom surface of the center piece and having a length that extends substantially along the entire length of the center piece, the slot comprising a lower portion positioned below an upper portion, wherein the upper portion of the slot is wider than the lower portion of the slot and a top surface of the lower portion of the slot forms two ledges, and wherein the upper portion of the slot is continuous along the length of the slot;
   a first sliding assembly slidingly engaging the center piece and an interior surface of the first support piece;
   a second sliding assembly slidingly engaging the center piece and an interior surface of the second support piece,
   wherein the center piece is operable to slide between the first support piece and the second support piece from a retracted position substantially aligned between the first and second support pieces to an extended position protruding from between the first and second support pieces; and
   at least one hook comprising a base, a shank extending from the base and ending in a lower end opposite the base, wherein the at least one hook is configured to be disposed in the slot formed in the center piece with a lower surface portion of the base resting on the two ledges formed by the top surface of the lower portion of the slot, wherein the shank extends through the slot formed in the center piece, and wherein the lower end of the hook extends below the bottom surface of the center piece, wherein the at least one hook can be added to, and removed from, the storage device by inserting the at least one hook through the slot from a top side of the center piece to adjust at least one of the arrangement, position, and number of hooks associated with the storage device without disassembly of the storage device, and without first removing a hook positioned in the slot of the storage device.

2. The storage device of claim 1, wherein the base of the at least one hook is sized to be positioned at least partially within the wider, upper portion of the slot, and wherein the at least one hook can be rotated about the shank to change the orientation of the lower end of the at least one hook.

3. The storage device of claim 1, wherein a width of the lower portion of the slot is about 0.25 inch to about 0.75 inch, wherein a width of the upper portion of the slot is about 0.75 inch to about 1.25 inches, and wherein the upper portion of the slot has a depth of about 0.25 inch to about 0.5 inch.

4. The storage device of claim 1, wherein the at least one hook can be repositioned along the length of the slot of the center piece.

5. The storage device of claim 3, further comprising at least one notch in the top surface of the center piece, and wherein the base of the at least one hook is positioned at least partially within the at least one notch.

6. The storage device of claim 1, wherein the base of the at least one hook is square or round in shape, wherein the base has a width of about 0.445 inch to about 1.445 inches, wherein the base has a thickness of about 0.25 inch to about 0.5 inch, and wherein the hook has a length of about 2 inches to about 8 inches.

7. The storage device of claim 1, wherein the at least one hook is configured as a single unit, and wherein a material of the at least one hook is selected from at least one of wood, a plastic, and a metal.

8. The storage device of claim 1, wherein the shank is connected to the base using a connector selected from the group consisting of a pin, a screw, a nail, a weld and a monolith.

9. The storage device of claim 1, wherein the length of the center piece is from about 6 inches to about 28 inches, wherein the center piece has a width of about 1 inch to about 7 inches, and wherein the length of the slot is from about 5 inches to about 27 inches.

10. The storage device of claim 9, wherein the first and second support pieces have a height of about 1 inch to about 3 inches, and wherein the first and second support pieces have a length of about 9.25 inches to about 29.25 inches.

11. The storage device of claim 10, further comprising a front piece interconnected to a front portion of the center piece, wherein the front piece has a width of about 3 inches to about 9.5 inches, and wherein the front piece has a height of about 1.25 inches to about 3.25 inches.

12. The storage device of claim 11, further comprising a top piece, wherein the first support piece and the second support piece are interconnected to a lower surface portion of the top piece and the first and second support pieces are substantially perpendicular to the top piece, wherein the top piece has a length of about 10 inches to about 30 inches, and wherein the top piece has a width of about 3 inches to about 9.5 inches.

13. The storage device of claim 12, wherein the first and second support pieces, the center piece, the top piece, and the front piece are made of wood.

14. The storage device of claim 1, wherein the first and second sliding assemblies have a retracted length of about 10 inches to about 28 inches, and wherein the first and second sliding assemblies have an extended length of about 20 inches to about 56 inches.

15. The storage device of claim 1, wherein the first sliding assembly comprises a first fixed rail attached to the interior surface of the first support piece, a second fixed rail attached to the first side surface of the center piece, and a first sliding rail, wherein the first sliding rail slidingly connects the first fixed rail with the second fixed rail; and wherein the second sliding assembly comprises a third fixed rail attached to the interior surface of the second support piece, a fourth fixed rail attached to the second side surface of the center piece, and a second sliding rail, wherein the second sliding rail slidingly connects the third fixed rail to the fourth fixed rail.

16. A method of forming a storage device, comprising:
forming a top piece;
forming a first support piece and a second support piece;
connecting the first and second support pieces to a lower surface portion of the top piece, wherein the first and second support pieces extend downwardly from the lower surface portion and are substantially perpendicular to the top piece;
attaching the top piece to a mounting surface;
forming a center piece comprising:
a length
a top surface opposite a bottom surface;
a first side surface opposite a second side surface; and
a slot, the slot extending from the top surface of the center piece through the center piece to the bottom surface and having a length that extends substantially along the entire length of the center piece, the slot comprising a lower portion positioned below an upper portion, wherein the upper portion of the slot is wider than the lower portion of the slot and a top surface of the lower portion of the slot forms two ledges, and wherein the upper portion of the slot is continuous along the length of the slot;
forming a front piece;
interconnecting the front piece to a front portion of the center piece;
slidingly interconnecting the first side surface of the center piece to the first support piece through a first sliding assembly engaging the center piece and an interior surface of the first support piece;
slidingly interconnecting the second side surface of the center piece to the second support piece through a second sliding assembly engaging the center piece and an interior surface of the second support piece,
wherein the second support piece is aligned substantially parallel to the first support piece, and wherein the center piece is operable to slide between the first and second support pieces from a retracted position substantially aligned between the first and second support pieces to an extended position protruding in front of the first and second support pieces; and
providing at least one hook configured to fit into the slot, wherein the at least one hook comprises a base, a shank extending from the base, and a lower end opposite the base, wherein a lower surface portion of the base is configured to rest on the two ledges formed by the top surface of the lower portion of the slot, wherein the shank extends through the slot in the center piece, and wherein the lower end of the at least one hook extends below the bottom surface of the center piece
wherein the at least one hook can be added to, and removed from, the storage device by inserting the at least one hook through the slot from a top side of the center piece to adjust at least one of the arrangement, position, and number of hooks associated with the storage device without disassembly of the storage device, and without first removing a hook positioned in the slot of the storage device.

17. The method of claim 16, wherein the base of the at least one hook is positioned at least partially within the wider, upper portion of the slot, and wherein the at least one hook can be rotated about the shank to change the orientation of the lower end of the at least one hook.

\* \* \* \* \*